United States Patent
Chuang et al.

(10) Patent No.: US 10,742,984 B2
(45) Date of Patent: *Aug. 11, 2020

(54) METHOD AND APPARATUS FOR MULTI-TABLE BASED CONTEXT ADAPTIVE BINARY ARITHMETIC CODING

(71) Applicant: MEDIATEK INC., Hsin-Chu (TW)

(72) Inventors: Tzu-Der Chuang, Zhubei (TW); Ching-Yeh Chen, Taipei (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,432

(22) Filed: Jan. 9, 2019

(65) Prior Publication Data

US 2019/0149824 A1    May 16, 2019

Related U.S. Application Data

(63) Continuation of application No. 15/572,600, filed as application No. PCT/CN2016/082645 on May 19, 2016, now Pat. No. 10,225,555.

(Continued)

(51) Int. Cl.
*H04N 19/13* (2014.01)
*H04N 19/91* (2014.01)
(Continued)

(52) U.S. Cl.
CPC .......... *H04N 19/13* (2014.11); *H04N 19/198* (2014.11); *H04N 19/423* (2014.11); *H04N 19/91* (2014.11)

(58) Field of Classification Search
CPC .... H04N 19/13; H04N 19/423; H04N 19/198; H04N 19/91
(Continued)

(56) References Cited

U.S. PATENT DOCUMENTS 7,592,937 B1    9/2009 Chang
8,351,500 B2 *  1/2013 Shimofure .......... H03M 7/4006
                                              375/240.01
(Continued)

FOREIGN PATENT DOCUMENTS

CN    101212676 A    7/2008
CN    101600104 A    12/2009
(Continued)

OTHER PUBLICATIONS

International Search Report dated Aug. 22, 2016, issued in application No. PCT/CN2016/082645.
(Continued)

*Primary Examiner* — Brian K Young
(74) *Attorney, Agent, or Firm* — McClure, Qualey & Rodack, LLP

(57) ABSTRACT

A method and apparatus of entropy coding for a video encoder or decoder using multiple-table based Context-Based Adaptive Binary Arithmetic Coder (CABAC) are disclosed. In one embodiment, a current bin of a binary data of a current coding symbol is encoded or decoded according to a probability of a binary value of the current bin and the probability of the binary value is updated according to the binary value of the current bin for a next bin by using multiple-parameter probability models. Each multiple-parameter probability model is updated using at least one lookup table with the individual set of probability state as a table index to access contents of said at least one lookup table. In another embodiment, the range update is calculated for a range interval based on middle value of the range interval.

8 Claims, 4 Drawing Sheets

Related U.S. Application Data

(60) Provisional application No. 62/322,306, filed on Apr. 14, 2016, provisional application No. 62/214,129, filed on Sep. 3, 2015, provisional application No. 62/163,473, filed on May 19, 2015.

(51) Int. Cl.
*H04N 19/423* (2014.01)
*H04N 19/196* (2014.01)

(58) Field of Classification Search
USPC .......................................... 341/51, 106, 107
See application file for complete search history.

(56) References Cited

U.S. PATENT DOCUMENTS

| | | | | |
|---|---|---|---|---|
| 9,020,289 | B2* | 4/2015 | Hayashi | G06T 9/00 |
| | | | | 382/239 |
| 9,323,744 | B2 | 4/2016 | Hagiwara | |
| 9,379,736 | B2* | 6/2016 | Sole Rojals | H03M 7/6023 |
| 9,407,936 | B2* | 8/2016 | Kim | H04N 19/46 |
| 9,661,326 | B2 | 5/2017 | Alshin et al. | |
| 9,871,537 | B2 | 1/2018 | Sole Rojals et al. | |
| 10,225,555 | B2* | 3/2019 | Chuang | H04N 19/91 |
| 2012/0082231 | A1 | 4/2012 | Rojals et al. | |
| 2013/0044810 | A1 | 2/2013 | Kao et al. | |
| 2013/0329784 | A1 | 12/2013 | Chuang et al. | |
| 2014/0177708 | A1 | 6/2014 | Alshin et al. | |

FOREIGN PATENT DOCUMENTS

| | | |
|---|---|---|
| CN | 103563381 A | 2/2014 |
| CN | 103581690 A | 2/2014 |
| CN | 103797803 A | 5/2014 |
| KR | 10-2014-0017016 A | 2/2014 |
| KR | 10-2014-0085546 A | 7/2014 |
| TW | 201250498 A | 12/2012 |
| WO | 2013/063371 A1 | 5/2013 |

OTHER PUBLICATIONS

Alshin, A., et al.; "Multi-parameter probability up-date for CABAC;" JCTVC-F254; Joint Collaborative Team on Video Coding (JCT-VC) of ITU-T SG16 WP3 and ISO/IEC JTC1/SC29/WG11; 6th Meeting: Torino; Jul. 2011; pp. 1-5.

Rosewarne, C., et al.; "CE1: Modified probability update and table removal for multi-parameter CABAC update;" Document: JCTVC-H0140; Joint Collaborative Team on Video Coding (JCT-VC) of ITU-T SG16 WP3 and ISO/IEC JTC1/SC29/WG11; 8th Meeting: San Jose, California; Feb. 2012; pp. 1-4.

Rosewarne, C., et al.; "Modified probability update and table removal for multi-parameter CABAC update (F254);" JCTVC-G413; Joint Collaborative Team on Video Coding (JCT-VC) of ITU-T SG16 WP3 and ISO/IEC JTC1/SC29/WG11; 7th Meeting: Geneva, CH; Nov. 2011; pp. 1-5.

Alshin, A., et al.; "Multi-parameter probability up-date for CABAC;" Joint Collaborative Team on Video Coding (JCT-VC) of ITU-T SG16 WP3 and ISO/IEC JTC1/SC29/WG11; Jul. 2011; pp. 1-7.

\* cited by examiner

METHOD AND APPARATUS FOR MULTI-TABLE BASED CONTEXT ADAPTIVE BINARY ARITHMETIC CODING

CROSS REFERENCE TO RELATED APPLICATIONS

The present invention is a Continuation of pending U.S. patent application Ser. No. 15/572,600, filed on Nov. 8, 2017, now U.S. Pat. No. 10,225,555, which is a 371 of WO Application No. PCT/CN2016/082645, filed on May 19, 2016, which claims priority to U.S. Provisional Patent Application, Ser. No. 62/163,473, filed on May 19, 2015, U.S. Provisional Patent Application, Ser. No. 62/214,129, filed on Sep. 3, 2015 and U.S. Provisional Patent Application, Ser. No. 62/322,306, filed on Apr. 14, 2016. The U.S. Provisional Patent Applications are hereby incorporated by reference in their entireties.

FIELD OF THE INVENTION

The present invention relates to entropy coding techniques for image coding and video coding. In particular, the present invention relates to multi-table based Context-Based Adaptive Binary Arithmetic Coder (CABAC) for image coding and video coding.

BACKGROUND AND RELATED PRIOR ART

The arithmetic coding is known as one of the efficient data compressing methods, and is widely used in coding standards, including JBIG, JPEG2000, H.264/AVC, and High-Efficiency Video Coding (HEVC). In H.264/AVC and HEVC Test Model Version 16.0 (HM-16.0), context-based adaptive binary arithmetic coding (CABAC) is adopted as the entropy coding tool in the video coding system.

As shown in FIG. 1, CABAC consists of three parts: binarization unit 110, context modelling unit 120, and binary arithmetic coding unit 130. In the binarization step, each syntax element is uniquely mapped into a binary string (bin or bins). In the context modelling step, a probability model is selected for each bin. The corresponding probability model may depend on previously encoded syntax elements, bin indexes, and side information. After the binarization and the context model assignment, a bin value along with its associated model is transmitted to the binary arithmetic coding engine.

Binary arithmetic coding is a recursive interval-subdividing procedure. The output bitstream is the pointer to the final probability of coding interval. The probability of coding interval, T is specified by range and the lower bound of coding interval (designated as "low" in the following discussion). The range is the possible scope of the coding interval. Depending on whether the current symbol is the most probable symbol (MPS) or the least probable symbol (LPS), the next coding interval is updated as one of the two sub-intervals accordingly, as shown in eq. (1) and eq. (2).

$$range_{n+1} = \begin{cases} range_n - rangeLPS_n, & \text{if } MPS \\ rangeLPS_n, & \text{if } LPS \end{cases} \quad (1)$$

$$low_{n+1} = \begin{cases} low_n, & \text{if } MPS \\ low_n + range_n - rangeLPS_n, & \text{if } LPS \end{cases} \quad (2)$$

where rangeLPS is the estimated range when LPS is coded.

FIG. 2 illustrates the concept of the binary arithmetic coding. Initially, the probability range (i.e., $range_0$) is 1 and the low boundary (i.e., $low_0$) is 0 as indicated by probability scale 210. If the first symbol is a MPS symbol, a pointer in the lower part of the probability scale 210 may be used to signal the event of an MPS symbol. The $range_1$ is used as the probability scale 220 for processing the next symbol. Again, the probability scale 220 is divided into two parts for MPS and LPS respectively. If the second symbol is an LPS symbol, the $rangeLPS_1$ is selected as the probability scale 230 for the next symbol. Every time when a new symbol is coded, the corresponding range becomes smaller. When a range becomes too small, the range can be re-normalized to form a probability scale 240 with larger range.

In modern arithmetic coding, the probability update is often done according to a model. For example, a method is described by Marpe, et al., in a technical publication ("Context-Based Adaptive Binary Arithmetic Coding in the H.264/AVC Video Compression Standard", *IEEE Transactions on Circuits and Systems for Video Technology*, Vol. 13, No. 7, pp. 620-636, July 2003), where the following formula is used:

$$p_{new} = (1-\alpha) \cdot y + \alpha \cdot p_{old}. \quad (3)$$

In the above equation, y is equal to 0 if current symbol is a most probable symbol (MPS); otherwise, y is equal to 1. This formula provides an estimated value for probability of the least probable symbol (LPS). The weighting a is derived according to the following equation:

$$\alpha = (min\_prob/0.5)^{(1/state\_number)}, \quad (4)$$

where min_prob corresponds to the minimum probability of the least probable symbol of CABAC and state_number corresponds to the number of context states for probability value estimation.

For CABAC of HEVC, there are 64 probability states. The min_prob is 0.01875, and the state_number is 63. Each state has a probability value indicating the probability to select the LPS. The 64 representative probability values, $p_\sigma \in [0.01875, 0.5]$, were derived for the LPS by the following recursive equation:

$$P_\sigma = \alpha \cdot P_{\sigma-1} \text{ for all } \sigma=1, \ldots, 63,$$

$$\text{with } \alpha = (0.01875/0.5)^{1/63} \text{ and } p_0=0.5 \quad (5)$$

The rangeLPS value of a state σ is derived by the following equation:

$$rangeLPS\sigma = RANGE \times P_\sigma \quad (6)$$

To reduce the computations required for deriving rangeLPS, the result of rangeLPS of each range value can be pre-calculated and stored in a lookup table (LUT). In H.264/AVC and HEVC, a 4-column pre-calculated rangeLPS table is adopted to reduce the table size as shown in Table 1. The range is divided into four segments. In each segment, the rangeLPS of each probability state σ ($p_\sigma$) is pre-defined. In other words, the rangeLPS of a probability state σ is quantized into four values. The rangeLPS selected depends on the segment that the range belongs to.

TABLE 1

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 510 |
| | Range LPS | | | |
| 0 | 128 | 176 | 208 | 240 |
| 1 | 128 | 167 | 197 | 227 |
| 2 | 128 | 158 | 187 | 216 |
| 3 | 123 | 150 | 178 | 205 |
| 4 | 116 | 142 | 169 | 195 |
| 5 | 111 | 135 | 160 | 185 |
| 6 | 105 | 128 | 152 | 175 |
| 7 | 100 | 122 | 144 | 166 |
| 8 | 95 | 116 | 137 | 158 |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| 13 | 73 | 89 | 105 | 122 |
| 14 | 69 | 85 | 100 | 116 |
| 15 | 66 | 80 | 95 | 110 |
| 16 | 62 | 76 | 90 | 104 |
| 17 | 59 | 72 | 86 | 99 |
| 18 | 56 | 69 | 81 | 94 |
| 19 | 53 | 65 | 77 | 89 |
| 20 | 51 | 62 | 73 | 85 |
| 21 | 48 | 59 | 69 | 80 |
| 22 | 46 | 56 | 66 | 76 |
| 23 | 43 | 53 | 63 | 72 |
| 24 | 41 | 50 | 59 | 69 |
| 25 | 39 | 48 | 56 | 65 |
| 26 | 37 | 45 | 54 | 62 |
| 27 | 35 | 43 | 51 | 59 |
| 28 | 33 | 41 | 48 | 56 |
| 29 | 32 | 39 | 46 | 53 |
| 30 | 30 | 37 | 43 | 50 |
| 31 | 29 | 35 | 41 | 48 |
| 32 | 27 | 33 | 39 | 45 |
| 33 | 26 | 31 | 37 | 43 |
| 34 | 24 | 30 | 35 | 41 |
| 35 | 23 | 28 | 33 | 39 |
| 36 | 22 | 27 | 32 | 37 |
| 37 | 21 | 26 | 30 | 35 |
| 38 | 20 | 24 | 29 | 33 |
| 39 | 19 | 23 | 27 | 31 |
| 40 | 18 | 22 | 26 | 30 |
| 41 | 17 | 21 | 25 | 28 |
| 42 | 16 | 20 | 23 | 27 |
| 43 | 15 | 19 | 22 | 25 |
| 44 | 14 | 18 | 21 | 24 |
| 45 | 14 | 17 | 20 | 23 |
| 46 | 13 | 16 | 19 | 22 |
| 47 | 12 | 15 | 18 | 21 |
| 48 | 12 | 14 | 17 | 20 |
| 49 | 11 | 14 | 16 | 19 |
| 50 | 11 | 13 | 15 | 18 |
| 51 | 10 | 12 | 15 | 17 |
| 52 | 10 | 12 | 14 | 16 |
| 53 | 9 | 11 | 13 | 15 |
| 54 | 9 | 11 | 12 | 14 |
| 55 | 8 | 10 | 12 | 14 |
| 56 | 8 | 9 | 11 | 13 |
| 57 | 7 | 9 | 11 | 12 |
| 58 | 7 | 9 | 10 | 12 |
| 59 | 7 | 8 | 10 | 11 |
| 60 | 6 | 8 | 9 | 11 |
| 61 | 6 | 7 | 9 | 10 |
| 62 | 6 | 7 | 8 | 9 |
| 63 | 2 | 2 | 2 | 2 |

In JCTVC-F254 (Alshin et al., *Multi-parameter probability up-date for CABAC*, Joint Collaborative Team on Video Coding (JCT-VC) of ITU-T SG16 WP3 and ISO/IEC JTC1/SC29/WG11, 6th Meeting: Torino, IT, 14-22 Jul. 2011, Document: JCTVC-F254), Alshin, et al., disclose a multi-parameter probability update for the CABAC of the HEVC standard. The parameter $N=1/(1-\alpha)$ is an approximate measurement for number of previously encoded bins (i.e., "window size") that have significant influence on the current bin. The choice of parameter N determines sensitivity of the model. A sensitive system will react to real changing quickly. On the other hand, a less sensitive model will not react to noise and random errors. Both properties are useful but contradictory. Accordingly, Alshin, et al., disclose a method to calculate several values with different $\alpha_i$ simultaneously:

$$p_{i\_new}=(1-\alpha_i)\cdot y+\alpha_i\cdot pi\_old \qquad (7)$$

and use weighted average as next bin probability prediction:

$$p_{new}=\Sigma(\beta_i\cdot p_{i\_new}), \qquad (8)$$

where $\beta_i$ is a weighting factor associated with $\alpha_i$.

Instead of state transition lookup tables (m_aucNextStateMPS and m_aucNextStateLPS) utilized in CABAC of the AVC standard for updating the state and its corresponding probability, Alshin, et al., use the explicit calculation with multiplication free formula for probability update. Assuming that probability $p_i$ is represented by integer number $P_i$ from 0 to $2^k$ (i.e., $p_i=P_i/2^k$) and $\alpha_i$ is represented by 1 over a power of two number (i.e., $\alpha_i=\frac{1}{2}^{M_i}$), multiplication free formula for probability update can be derived as follows:

$$P_i=(Y>>M_i)+P-(P_i>>M_i). \qquad (9)$$

This formula predicts probability that next bin will be "1", where $Y=2^k$ if the last coding bin is "1", $Y=0$ if the last coding bin is "0", and ">>$M_i$" corresponds to the right shift by $M_i$ bits operation.

To keep balance between complexity increase and performance improvement, it is considered that linear combination for probability estimation consists of only two parameters:

$$P_0=(Y>>4)+P_0-(P_0>>4), \qquad (10)$$

$$P_1=(Y>>7)+P_1-(P_0>>7), \text{ and} \qquad (11)$$

$$P=(P_0+P_1+1)>>1. \qquad (12)$$

Floating point value that corresponds to probability for AVC CABAC is always less than or equal to ½. If the probability exceeds this limit, LPS becomes MPS to keep probability inside interval mentioned above. It needs MPS/LPS switching when the probability of MPS/LPS is larger than 0.5. Alshin, et al., proposed to increase permissible level of probability (in terms of float-point values) up to 1 to avoid MPS/LPS switching. Therefore, one lookup table (LUT) for storing RangeOne or RangeZero is derived.

In VCEG-AZ07 (Chen, et al., "Further improvements to HMKTA-1.0", ITU-T Video Coding Experts Group (VCEG) meeting, Warsaw, Poland, IT, 19-26 Jun. 2015, Document: VCEG-AZ07), Chen, et al., proposed to use a single parameter CABAC. The probability derivation is the same as JCTVC-F254, which uses eq. (9) to derive the probability of being one or zero. For each context, only one updating speed is used, which means for each context, only one N is used. However, different contexts can use different N's. The range for N is from 4 to 7, and a 2-bit variable is used to indicate the probability updating speed for a specific context model. The N value is determined at the encoder side and signalled in the bitstream.

In JCTVC-F254 and VCEG-AZ07, the LUT of RangeOne or RangeZero is a 64-column by 512-row table. The input of the LUT is current range and the current probability. The valid range of the current range is from 256 to 510. The current range is divided into 64 sections, where each section contains 4 values of current range (e.g. 256 to 259, 260 to 263, etc.). The section index of range can be derived by:

$$\text{rangeIdx}=(\text{range}>>2)-64, \text{ or} \quad (13)$$

$$\text{rangeIdx}=(\text{range}>>2)\&63 \quad (14)$$

The valid range of the current probability (P) is from 0 to $2^k-1$. In JCTVC-F254 and VCEG-AZ07, the k is 15. The current probability is divided into 512 sections, where each section contains 64 values of current probability (e.g. 0 to 63, 64 to 127, etc.). The section index of probability can be derived by $$\text{probIdx}=(P>>6). \quad (15)$$

The RangeOne value can be derived by table lookup, for example $$\text{RangeOne}=\text{tableRangeOne}[\text{rangeIdx}][\text{probIdx}] \quad (16)$$

Each value in tableRangeOne is derived by $$\text{EntryValue}=\text{Round}(\text{clip3}(3,\text{MinRange}-3, \text{MinRange}*(\text{probIdx}+0.5)/M)), \quad (17)$$

where MinRange is the lowest range value of the derived rangeIdx. The clip3(X, Y, Z) is to clip the Z value within the range of X to Y. The Round is to round the value to an integer.

For example, the range section for rangeIdx=0 is 256 to 259, the MinRange is 256. The MinRange can be derived by $$\text{MinRange}=256+(\text{rangeIdx}<<2) \quad (18)$$

The M is the maximum value of (probIdx+1). For example, in JCTVC-F254 and VCEG-AZ07, the M is 512. Table 2 shows the lookup table disclosed in JCTVC-F254, which consists of 64 columns for the range values and 512 entries. For each entry, the range value is represented by 9 bits.

TABLE 2

| | | (Range >> 2)&63 | | |
|---|---|---|---|---|
| Sets | 0 | 1 | ... | 63 |
| Range Min | 256 | 260 | ... | 508 |
| Range Max | 259 | 263 | ... | 511 |
| $P_{one} >> 6$ | $P_{One}$ | | Range One | |
| ... | ... | ... | ... | ... |
| 10 | 0.02 | 5 | 5 | ... | 10 |
| 11 | 0.023 | 6 | 6 | ... | 11 |
| 12 | 0.024 | 6 | 6 | ... | 12 |
| 13 | 0.026 | 7 | 7 | ... | 13 |
| 14 | 0.028 | 7 | 7 | ... | 14 |
| 15 | 0.03 | 8 | 8 | ... | 15 |
| ... | ... | ... | ... | ... | ... |
| 511 | 0.999 | 255 | 259 | ... | 507 |

Two in-loop filters are included in H.265/HEVC video coding standard. They are deblocking filter and sample adaptive offset (SAO). The deblocking filter can reduce the blocky artifacts caused by quantization error. SAO can further improve the video quality by applying offset values to classified samples. Prior to HEVC Test Model 7 (HM-7), another in-loop filtering technique named adaptive loop filter (ALF) was also included. ALF uses Wiener filtering techniques to derive filter coefficients. Multiple filters are coded according to different picture regions. The filter coefficients are coded in adaptation parameter set (APS), and on/off control flags are coded using CTU-level (coding tree unit level) syntax elements.

It is obvious that filter coefficients are the major bitrate overhead when coding ALF syntax elements. Usually, the texture characteristics of neighbouring coding block are very similar to the current coding block. Therefore, the neighbouring coding block filter can be directly used for the current coding block to save bitrate overhead. Since two neighbouring blocks apply the same filter coefficients in this case, this coding method is also called filter merge. A priority-based block filter merge scheme has also been disclosed. The first step is to choose maximum N candidates from M pre-defined neighbouring blocks. The second step is to select one filter among N candidates and code its filter index to bitstream. In the following, a method to further improve the performance of the priority-based block filter merge scheme is disclosed.

When multiple filters are supported in ALF, besides dividing one picture into different regions, some pixel-based or block-based classification methods are also presented before HM-7. For example, an ALF technique to calculate the Sum-modified Laplacian Measure (SLM) of each pixel has been disclosed. Pixels with the same SLM value will be filtered by one filter. As shown in FIG. 3, each square denotes a pixel, and pixels of SLMn are filtered by one filter, where n can be 1, 2, or 3 in this example. Here, the SLM is treated as a kind of pixel classification rule (PCR). For block-based classification method, the first step is similar to the pixel-based classification to calculate the characteristic of each pixel in one block. The second step is to calculate the property of one block based on the characteristics of all pixels in one block.

BRIEF SUMMARY OF THE INVENTION

A method and apparatus of entropy coding of image and video data for an image or video encoder or decoder using multiple-table based Context-Based Adaptive Binary Arithmetic Coder (CABAC) are disclosed. In one embodiment, a current bin of a binary data of a current coding symbol is encoded or decoded according to a probability of a binary value of the current bin and the probability of the binary value is updated according to the binary value of the current bin for a next bin by using multiple-parameter probability models. The probability of the binary value of the current bin is generated from one or more previously coded symbols before the current coding symbol. Each multiple-parameter probability model is updated using an individual set of probability states associated with a corresponding parameter. In particular, each multiple-parameter probability model is updated using at least one lookup table with the individual set of probability state as a table index to access contents of said at least one lookup table.

In one example, the lookup table comprises an LPS (least probably symbol) range table, where the LPS range table includes pre-determined LPS range for a given probability state and a current range. The LPS range table may include the pre-determined LPS range for the given probability state and a quantized current range to reduce table size. The LPS range table may store range values for a reduced number of the individual set of probability states, and the reduced number of the individual set of probability states are selected by uniformly retaining one probability state out of every M probability states and M is a positive integer greater than 1. For example, the M corresponds to 2, 4 or 8. The LPS range table may store range values for a reduced number of the individual set of probability states, and the reduced number of the individual set of probability states are selected by non-uniformly retaining the individual set of probability states.

The lookup table may comprise a next LPS (least probably symbol) state table or a next MPS (most probably symbol) state table, where the next LPS state table or the next MPS state table includes a next LPS probability state for each current LPS probability state or a next MPS probability state for each current MPS probability state. The next LPS state table may store next LPS states for a reduced number of the LPS probability states, or the next MPS state table stores next MPS states for a reduced number of the MPS probability states.

The multiple-parameter probability models may correspond to two-parameter probability models using a first parameter and a second parameter, and the first parameter is derived based on the second parameter. The first parameter can be equal to the second parameter raised to a power of M, and M is an integer greater than 1. An updated probability of the binary value can be derived from new individual probabilities updated according to the multiple-parameter probability models. Derivation of final probability based on the probabilities of two respective probability states associated with two probability parameters is also disclosed.

Another method of entropy coding of image and video data in an image or video encoder or decoder is also disclosed. The current bin of a binary data of a current coding symbol is encoded or decoded according to a probability of a binary value of the current bin, where the probability of the binary value of the current bin is generated from one or more previously coded symbols before the current coding symbol. The probability of the binary value is then updated according to the binary value of the current bin for a next bin; and encoding or decoding the current bin by using range One or range Zero values derived from at least one range lookup table. A range smaller half (rangeSH), the range One or range Zero values are derived for a given range interval based on the given range interval and a given probability of the binary value.

The at least one range lookup table may comprise a range Zero table or a range One table. One range value can be derived for a middle range value of the given range interval and a middle probability value of given range interval of Zero probability range or One probability range. One range value can be derived for a middle range value of the given range interval and a maximum probability value of the given range interval of Zero probability range or One probability range. The at least one range lookup table may only include range values for Zero probability range or One probability range between 0.0 and 0.5. The range value of the Zero probability range or One probability range between 0.5 and 1.0 may be derived by (current range–the range values for One probability range or Zero probability range between 0.0 and 0.5). The at least one range lookup table may include range values for Zero probability range or One probability range between 0.0 and 1.0, where the range values for the Zero probability range or the One probability range between 0.5 and 1.0 are mirrored from the range values for the Zero probability range or the One probability range between 0.0 and 0.5.

DETAILED DESCRIPTION OF THE INVENTION

Figure 1:
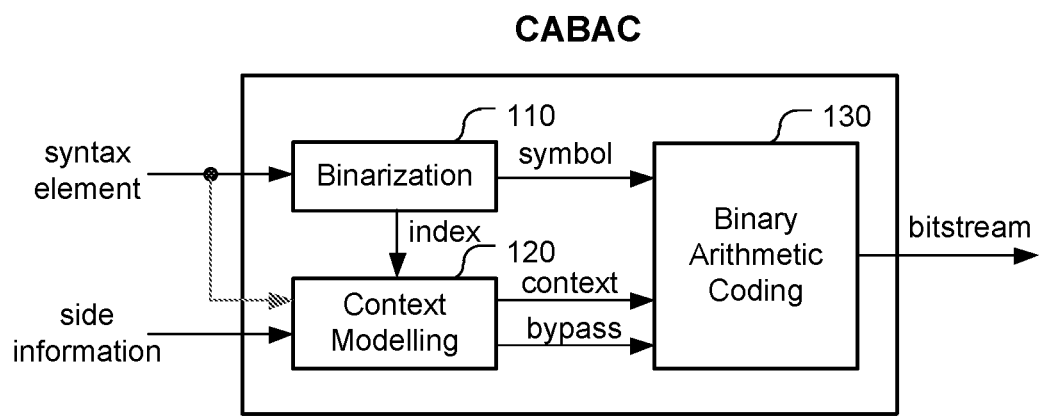
FIG. 1 illustrates a basic structure of context-based adaptive binary arithmetic coding (CABAC).
Figure 2:
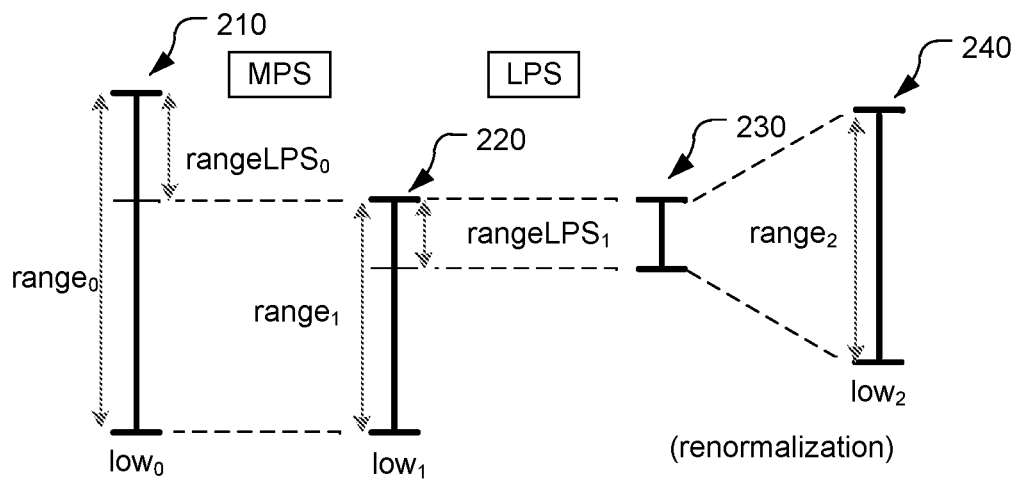
FIG. 2 illustrates a concept of the binary arithmetic coding, where initially, the probability range (i.e., range$_0$) is 1 and the low boundary (i.e., low$_0$) is 0 as indicated by a probability scale.

The following description is of the best-contemplated mode of carrying out the invention. This description is made for the purpose of illustrating the general principles of the invention and should not be taken in a limiting sense. The scope of the invention is best determined by reference to the appended claims.

In JCTVC-F254 and VCEG-AZ07, instead of storing the probability state index, the actual probability of each context is stored in a 16-bits or 32-bits buffer. Comparing to 7-bits state index used in HEVC, the implementation cost increases substantially. For deriving the interval of RangeOne or RangeZero, a 9-bits*64-column*512-entries (i.e., 294912 bits) lookup table is used. The size of lookup table is quite large for a parser. Accordingly, in this invention, a multi-table-based CABAC coding is disclosed. By using the formula in eq. (4) or eq. (19), one or multiple α's are derived. Once an α is derived, other α can be derived by using eq. (20):

$$\alpha_2 = 1 - (1/(2^N)), \text{ and} \qquad (19)$$

$$\alpha_1 = (\alpha_2)^M. \qquad (20)$$

For example, the N can be 7 and M can be 16. Accordingly, the $\alpha_2$ can be 1−(1/128) and $\alpha_1$ can be $(\alpha_2)^{16}$.

Using the derived α and eq. 3 or eq. 21 (the modified eq. 3), the LPS probability is also derived:

$$p_{i+1} = \alpha \cdot p_i, \text{ where } p_0 \text{ is } 0.5. \qquad (21)$$

The multiple α's for deriving the probability states mentioned above are also called multiple parameters or multiple model parameters in this disclosure. As shown above, these probability states correspond to a set of pre-defined values associated with LPS or MPS probability. However, other parameters, such as N and M in the above example, may also be used directly or indirectly as probability model parameter. While the form of probability state is described using eq. (21) and the forms of parameters are described in eq. (19) and (20), it is noted that other equivalent parameter forms are also used in this field. For example, (1−α), (1−α$_1$) and (1−α$_2$) have been used to replace the α, α$_1$ and α$_2$ in eqs. (19) to (21). It is understood that these different forms are equivalent and can be used interchangeably.

Using the new α and new p, the new range LPS tables for $\alpha_1$ and $\alpha_2$, can be derived as shown in Table 3 (for $\alpha_1$) and Tables 4a to 4h (for $\alpha_2$) respectively.

TABLE 3

| | (Range >> 6)&3 Sets | | | |
|---|---|---|---|---|
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 0 | 144 | 176 | 208 | 240 |
| 1 | 127 | 155 | 183 | 212 |
| 2 | 112 | 137 | 162 | 187 |
| 3 | 99 | 121 | 143 | 165 |
| 4 | 87 | 107 | 126 | 145 |
| 5 | 77 | 94 | 111 | 128 |
| 6 | 68 | 83 | 98 | 113 |
| 7 | 60 | 73 | 86 | 100 |
| 8 | 53 | 64 | 76 | 88 |
| 9 | 47 | 57 | 67 | 78 |
| 10 | 41 | 50 | 59 | 68 |
| 11 | 36 | 44 | 52 | 60 |
| 12 | 32 | 39 | 46 | 53 |
| 13 | 28 | 34 | 41 | 47 |
| 14 | 25 | 30 | 36 | 41 |
| 15 | 22 | 27 | 32 | 37 |
| 16 | 19 | 24 | 28 | 32 |
| 17 | 17 | 21 | 25 | 28 |
| 18 | 15 | 18 | 22 | 25 |
| 19 | 13 | 16 | 19 | 22 |
| 20 | 12 | 14 | 17 | 20 |
| 21 | 10 | 13 | 15 | 17 |
| 22 | 9 | 11 | 13 | 15 |
| 23 | 8 | 10 | 12 | 13 |
| 24 | 7 | 9 | 10 | 12 |
| 25 | 6 | 8 | 9 | 10 |
| 26 | 6 | 7 | 8 | 9 |
| 27 | 5 | 6 | 7 | 8 |
| 28 | 4 | 5 | 6 | 7 |
| 29 | 4 | 5 | 5 | 6 |
| 30 | 3 | 4 | 5 | 6 |
| 31 | 3 | 4 | 4 | 5 |

TABLE 4a

| | (Range >> 6)&3 Sets | | | |
|---|---|---|---|---|
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 0 | 144 | 176 | 208 | 240 |
| 1 | 143 | 175 | 206 | 238 |
| 2 | 142 | 173 | 205 | 236 |
| 3 | 141 | 172 | 203 | 234 |
| 4 | 140 | 171 | 202 | 233 |
| 5 | 138 | 169 | 200 | 231 |
| 6 | 137 | 168 | 198 | 229 |
| 7 | 136 | 167 | 197 | 227 |
| 8 | 135 | 165 | 195 | 225 |
| 9 | 134 | 164 | 194 | 224 |
| 10 | 133 | 163 | 192 | 222 |
| 11 | 132 | 161 | 191 | 220 |
| 12 | 131 | 160 | 189 | 218 |
| 13 | 130 | 159 | 188 | 217 |

TABLE 4a-continued

| | (Range >> 6)&3 Sets | | | |
|---|---|---|---|---|
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 14 | 129 | 158 | 186 | 215 |
| 15 | 128 | 156 | 185 | 213 |
| 16 | 127 | 155 | 183 | 212 |
| 17 | 126 | 154 | 182 | 210 |
| 18 | 125 | 153 | 181 | 208 |
| 19 | 124 | 152 | 179 | 207 |
| 20 | 123 | 150 | 178 | 205 |
| 21 | 122 | 149 | 176 | 204 |
| 22 | 121 | 148 | 175 | 202 |
| 23 | 120 | 147 | 174 | 200 |
| 24 | 119 | 146 | 172 | 199 |
| 25 | 118 | 145 | 171 | 197 |
| 26 | 117 | 144 | 170 | 196 |
| 27 | 117 | 142 | 168 | 194 |
| 28 | 116 | 141 | 167 | 193 |
| 29 | 115 | 140 | 166 | 191 |
| 30 | 114 | 139 | 164 | 190 |
| 31 | 113 | 138 | 163 | 188 |
| 32 | 112 | 137 | 162 | 187 |
| 33 | 111 | 136 | 161 | 185 |
| 34 | 110 | 135 | 159 | 184 |
| 35 | 109 | 134 | 158 | 182 |
| 36 | 109 | 133 | 157 | 181 |
| 37 | 108 | 132 | 156 | 180 |
| 38 | 107 | 131 | 154 | 178 |
| 39 | 106 | 130 | 153 | 177 |
| 40 | 105 | 129 | 152 | 175 |
| 41 | 104 | 128 | 151 | 174 |
| 42 | 104 | 127 | 150 | 173 |
| 43 | 103 | 126 | 148 | 171 |
| 44 | 102 | 125 | 147 | 170 |
| 45 | 101 | 124 | 146 | 169 |
| 46 | 100 | 123 | 145 | 167 |
| 47 | 100 | 122 | 144 | 166 |
| 48 | 99 | 121 | 143 | 165 |
| 49 | 98 | 120 | 142 | 163 |
| 50 | 97 | 119 | 141 | 162 |
| 51 | 97 | 118 | 139 | 161 |
| 52 | 96 | 117 | 138 | 160 |
| 53 | 95 | 116 | 137 | 158 |
| 54 | 94 | 115 | 136 | 157 |
| 55 | 94 | 114 | 135 | 156 |
| 56 | 93 | 113 | 134 | 155 |
| 57 | 92 | 113 | 133 | 153 |
| 58 | 91 | 112 | 132 | 152 |
| 59 | 91 | 111 | 131 | 151 |
| 60 | 90 | 110 | 130 | 150 |
| 61 | 89 | 109 | 129 | 149 |
| 62 | 89 | 108 | 128 | 148 |
| 63 | 88 | 107 | 127 | 146 |

TABLE 4b

| | (Range >> 6)&3 Sets | | | |
|---|---|---|---|---|
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 64 | 87 | 107 | 126 | 145 |
| 65 | 86 | 106 | 125 | 144 |
| 66 | 86 | 105 | 124 | 143 |
| 67 | 85 | 104 | 123 | 142 |
| 68 | 84 | 103 | 122 | 141 |
| 69 | 84 | 102 | 121 | 140 |
| 70 | 83 | 102 | 120 | 139 |
| 71 | 83 | 101 | 119 | 138 |
| 72 | 82 | 100 | 118 | 136 |
| 73 | 81 | 99 | 117 | 135 |
| 74 | 81 | 99 | 116 | 134 |
| 75 | 80 | 98 | 116 | 133 |
| 76 | 79 | 97 | 115 | 132 |
| 77 | 79 | 96 | 114 | 131 |
| 78 | 78 | 95 | 113 | 130 |
| 79 | 77 | 95 | 112 | 129 |
| 80 | 77 | 94 | 111 | 128 |
| 81 | 76 | 93 | 110 | 127 |
| 82 | 76 | 93 | 109 | 126 |
| 83 | 75 | 92 | 108 | 125 |
| 84 | 75 | 91 | 108 | 124 |
| 85 | 74 | 90 | 107 | 123 |
| 86 | 73 | 90 | 106 | 122 |
| 87 | 73 | 89 | 105 | 121 |
| 88 | 72 | 88 | 104 | 120 |
| 89 | 72 | 88 | 103 | 119 |
| 90 | 71 | 87 | 103 | 118 |
| 91 | 71 | 86 | 102 | 118 |
| 92 | 70 | 86 | 101 | 117 |
| 93 | 69 | 85 | 100 | 116 |
| 94 | 69 | 84 | 100 | 115 |
| 95 | 68 | 84 | 99 | 114 |
| 96 | 68 | 83 | 98 | 113 |
| 97 | 67 | 82 | 97 | 112 |
| 98 | 67 | 82 | 96 | 111 |
| 99 | 66 | 81 | 96 | 110 |
| 100 | 66 | 80 | 95 | 110 |
| 101 | 65 | 80 | 94 | 109 |
| 102 | 65 | 79 | 93 | 108 |
| 103 | 64 | 78 | 93 | 107 |
| 104 | 64 | 78 | 92 | 106 |
| 105 | 63 | 77 | 91 | 105 |
| 106 | 63 | 77 | 91 | 105 |
| 107 | 62 | 76 | 90 | 104 |
| 108 | 62 | 75 | 89 | 103 |
| 109 | 61 | 75 | 88 | 102 |
| 110 | 61 | 74 | 88 | 101 |
| 111 | 60 | 74 | 87 | 100 |
| 112 | 60 | 73 | 86 | 100 |
| 113 | 59 | 73 | 86 | 99 |
| 114 | 59 | 72 | 85 | 98 |
| 115 | 58 | 71 | 84 | 97 |
| 116 | 58 | 71 | 84 | 97 |
| 117 | 58 | 70 | 83 | 96 |
| 118 | 57 | 70 | 82 | 95 |
| 119 | 57 | 69 | 82 | 94 |
| 120 | 56 | 69 | 81 | 94 |
| 121 | 56 | 68 | 81 | 93 |
| 122 | 55 | 68 | 80 | 92 |
| 123 | 55 | 67 | 79 | 91 |
| 124 | 54 | 67 | 79 | 91 |
| 125 | 54 | 66 | 78 | 90 |
| 126 | 54 | 66 | 77 | 89 |
| 127 | 53 | 65 | 77 | 89 |

TABLE 4c

| | (Range >> 6)&3 Sets | | | |
|---|---|---|---|---|
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 128 | 53 | 64 | 76 | 88 |
| 129 | 52 | 64 | 76 | 87 |
| 130 | 52 | 63 | 75 | 87 |
| 131 | 52 | 63 | 74 | 86 |
| 132 | 51 | 63 | 74 | 85 |
| 133 | 51 | 62 | 73 | 85 |
| 134 | 50 | 62 | 73 | 84 |
| 135 | 50 | 61 | 72 | 83 |
| 136 | 50 | 61 | 72 | 83 |
| 137 | 49 | 60 | 71 | 82 |
| 138 | 49 | 60 | 70 | 81 |
| 139 | 48 | 59 | 70 | 81 |
| 140 | 48 | 59 | 69 | 80 |
| 141 | 48 | 58 | 69 | 79 |
| 142 | 47 | 58 | 68 | 79 |
| 143 | 47 | 57 | 68 | 78 |
| 144 | 47 | 57 | 67 | 78 |
| 145 | 46 | 56 | 67 | 77 |
| 146 | 46 | 56 | 66 | 76 |
| 147 | 45 | 56 | 66 | 76 |
| 148 | 45 | 55 | 65 | 75 |
| 149 | 45 | 55 | 65 | 75 |
| 150 | 44 | 54 | 64 | 74 |
| 151 | 44 | 54 | 64 | 73 |
| 152 | 44 | 53 | 63 | 73 |
| 153 | 43 | 53 | 63 | 72 |
| 154 | 43 | 53 | 62 | 72 |
| 155 | 43 | 52 | 62 | 71 |
| 156 | 42 | 52 | 61 | 71 |
| 157 | 42 | 51 | 61 | 70 |
| 158 | 42 | 51 | 60 | 70 |
| 159 | 41 | 51 | 60 | 69 |
| 160 | 41 | 50 | 59 | 68 |
| 161 | 41 | 50 | 59 | 68 |
| 162 | 40 | 49 | 58 | 67 |
| 163 | 40 | 49 | 58 | 67 |
| 164 | 40 | 49 | 57 | 66 |
| 165 | 39 | 48 | 57 | 66 |
| 166 | 39 | 48 | 57 | 65 |
| 167 | 39 | 47 | 56 | 65 |
| 168 | 39 | 47 | 56 | 64 |
| 169 | 38 | 47 | 55 | 64 |
| 170 | 38 | 46 | 55 | 63 |
| 171 | 38 | 46 | 54 | 63 |
| 172 | 37 | 46 | 54 | 62 |
| 173 | 37 | 45 | 54 | 62 |
| 174 | 37 | 45 | 53 | 61 |
| 175 | 36 | 45 | 53 | 61 |
| 176 | 36 | 44 | 52 | 60 |
| 177 | 36 | 44 | 52 | 60 |
| 178 | 36 | 44 | 51 | 59 |
| 179 | 35 | 43 | 51 | 59 |
| 180 | 35 | 43 | 51 | 58 |
| 181 | 35 | 43 | 50 | 58 |
| 182 | 35 | 42 | 50 | 58 |
| 183 | 34 | 42 | 50 | 57 |
| 184 | 34 | 42 | 49 | 57 |
| 185 | 34 | 41 | 49 | 56 |
| 186 | 33 | 41 | 48 | 56 |
| 187 | 33 | 41 | 48 | 55 |
| 188 | 33 | 40 | 48 | 55 |
| 189 | 33 | 40 | 47 | 55 |
| 190 | 32 | 40 | 47 | 54 |
| 191 | 32 | 39 | 47 | 54 |

TABLE 4d

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 511 |
| | Range LPS | | | |
| 192 | 32 | 39 | 46 | 53 |
| 193 | 32 | 39 | 46 | 53 |
| 194 | 31 | 38 | 45 | 52 |
| 195 | 31 | 38 | 45 | 52 |
| 196 | 31 | 38 | 45 | 52 |
| 197 | 31 | 38 | 44 | 51 |
| 198 | 30 | 37 | 44 | 51 |
| 199 | 30 | 37 | 44 | 50 |
| 200 | 30 | 37 | 43 | 50 |
| 201 | 30 | 36 | 43 | 50 |
| 202 | 30 | 36 | 43 | 49 |
| 203 | 29 | 36 | 42 | 49 |
| 204 | 29 | 36 | 42 | 48 |
| 205 | 29 | 35 | 42 | 48 |
| 206 | 29 | 35 | 41 | 48 |
| 207 | 28 | 35 | 41 | 47 |
| 208 | 28 | 34 | 41 | 47 |
| 209 | 28 | 34 | 40 | 47 |
| 210 | 28 | 34 | 40 | 46 |
| 211 | 28 | 34 | 40 | 46 |
| 212 | 27 | 33 | 39 | 46 |
| 213 | 27 | 33 | 39 | 45 |
| 214 | 27 | 33 | 39 | 45 |
| 215 | 27 | 33 | 39 | 44 |
| 216 | 26 | 32 | 38 | 44 |
| 217 | 26 | 32 | 38 | 44 |
| 218 | 26 | 32 | 38 | 43 |
| 219 | 26 | 32 | 37 | 43 |
| 220 | 26 | 31 | 37 | 43 |
| 221 | 25 | 31 | 37 | 42 |
| 222 | 25 | 31 | 36 | 42 |
| 223 | 25 | 31 | 36 | 42 |
| 224 | 25 | 30 | 36 | 41 |
| 225 | 25 | 30 | 36 | 41 |
| 226 | 24 | 30 | 35 | 41 |
| 227 | 24 | 30 | 35 | 40 |
| 228 | 24 | 29 | 35 | 40 |
| 229 | 24 | 29 | 35 | 40 |
| 230 | 24 | 29 | 34 | 40 |
| 231 | 24 | 29 | 34 | 39 |
| 232 | 23 | 29 | 34 | 39 |
| 233 | 23 | 28 | 33 | 39 |
| 234 | 23 | 28 | 33 | 38 |
| 235 | 23 | 28 | 33 | 38 |
| 236 | 23 | 28 | 33 | 38 |
| 237 | 22 | 27 | 32 | 37 |
| 238 | 22 | 27 | 32 | 37 |
| 239 | 22 | 27 | 32 | 37 |
| 240 | 22 | 27 | 32 | 37 |
| 241 | 22 | 27 | 31 | 36 |
| 242 | 22 | 26 | 31 | 36 |
| 243 | 21 | 26 | 31 | 36 |
| 244 | 21 | 26 | 31 | 35 |
| 245 | 21 | 26 | 30 | 35 |
| 246 | 21 | 26 | 30 | 35 |
| 247 | 21 | 25 | 30 | 35 |
| 248 | 21 | 25 | 30 | 34 |
| 249 | 20 | 25 | 30 | 34 |
| 250 | 20 | 25 | 29 | 34 |
| 251 | 20 | 25 | 29 | 34 |
| 252 | 20 | 24 | 29 | 33 |
| 253 | 20 | 24 | 29 | 33 |
| 254 | 20 | 24 | 28 | 33 |
| 255 | 19 | 24 | 28 | 32 |

TABLE 4e

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 511 |
| | Range LPS | | | |
| 256 | 19 | 24 | 28 | 32 |
| 257 | 19 | 23 | 28 | 32 |
| 258 | 19 | 23 | 27 | 32 |
| 259 | 19 | 23 | 27 | 31 |
| 260 | 19 | 23 | 27 | 31 |
| 261 | 19 | 23 | 27 | 31 |
| 262 | 18 | 23 | 27 | 31 |
| 263 | 18 | 22 | 26 | 31 |
| 264 | 18 | 22 | 26 | 30 |
| 265 | 18 | 22 | 26 | 30 |
| 266 | 18 | 22 | 26 | 30 |
| 267 | 18 | 22 | 26 | 30 |
| 268 | 18 | 22 | 25 | 29 |
| 269 | 17 | 21 | 25 | 29 |
| 270 | 17 | 21 | 25 | 29 |
| 271 | 17 | 21 | 25 | 29 |
| 272 | 17 | 21 | 25 | 28 |
| 273 | 17 | 21 | 24 | 28 |
| 274 | 17 | 21 | 24 | 28 |
| 275 | 17 | 20 | 24 | 28 |
| 276 | 17 | 20 | 24 | 28 |
| 277 | 16 | 20 | 24 | 27 |
| 278 | 16 | 20 | 24 | 27 |
| 279 | 16 | 20 | 23 | 27 |
| 280 | 16 | 20 | 23 | 27 |
| 281 | 16 | 19 | 23 | 26 |
| 282 | 16 | 19 | 23 | 26 |
| 283 | 16 | 19 | 23 | 26 |
| 284 | 16 | 19 | 22 | 26 |
| 285 | 15 | 19 | 22 | 26 |
| 286 | 15 | 19 | 22 | 25 |
| 287 | 15 | 19 | 22 | 25 |
| 288 | 15 | 18 | 22 | 25 |
| 289 | 15 | 18 | 22 | 25 |
| 290 | 15 | 18 | 21 | 25 |
| 291 | 15 | 18 | 21 | 24 |
| 292 | 15 | 18 | 21 | 24 |
| 293 | 14 | 18 | 21 | 24 |
| 294 | 14 | 18 | 21 | 24 |
| 295 | 14 | 17 | 21 | 24 |
| 296 | 14 | 17 | 20 | 24 |
| 297 | 14 | 17 | 20 | 23 |
| 298 | 14 | 17 | 20 | 23 |
| 299 | 14 | 17 | 20 | 23 |
| 300 | 14 | 17 | 20 | 23 |
| 301 | 14 | 17 | 20 | 23 |
| 302 | 13 | 16 | 19 | 22 |
| 303 | 13 | 16 | 19 | 22 |
| 304 | 13 | 16 | 19 | 22 |
| 305 | 13 | 16 | 19 | 22 |
| 306 | 13 | 16 | 19 | 22 |
| 307 | 13 | 16 | 19 | 22 |
| 308 | 13 | 16 | 19 | 21 |
| 309 | 13 | 16 | 18 | 21 |
| 310 | 13 | 15 | 18 | 21 |
| 311 | 13 | 15 | 18 | 21 |
| 312 | 12 | 15 | 18 | 21 |
| 313 | 12 | 15 | 18 | 21 |
| 314 | 12 | 15 | 18 | 20 |
| 315 | 12 | 15 | 18 | 20 |
| 316 | 12 | 15 | 17 | 20 |
| 317 | 12 | 15 | 17 | 20 |
| 318 | 12 | 15 | 17 | 20 |
| 319 | 12 | 14 | 17 | 20 |

TABLE 4f

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 511 |
| | Range LPS | | | |
| 320 | 12 | 14 | 17 | 20 |
| 321 | 12 | 14 | 17 | 19 |
| 322 | 12 | 14 | 17 | 19 |
| 323 | 11 | 14 | 17 | 19 |
| 324 | 11 | 14 | 16 | 19 |
| 325 | 11 | 14 | 16 | 19 |
| 326 | 11 | 14 | 16 | 19 |
| 327 | 11 | 14 | 16 | 18 |
| 328 | 11 | 13 | 16 | 18 |
| 329 | 11 | 13 | 16 | 18 |
| 330 | 11 | 13 | 16 | 18 |
| 331 | 11 | 13 | 16 | 18 |
| 332 | 11 | 13 | 15 | 18 |
| 333 | 11 | 13 | 15 | 18 |
| 334 | 10 | 13 | 15 | 17 |
| 335 | 10 | 13 | 15 | 17 |
| 336 | 10 | 13 | 15 | 17 |
| 337 | 10 | 13 | 15 | 17 |
| 338 | 10 | 12 | 15 | 17 |
| 339 | 10 | 12 | 15 | 17 |
| 340 | 10 | 12 | 14 | 17 |
| 341 | 10 | 12 | 14 | 17 |
| 342 | 10 | 12 | 14 | 16 |
| 343 | 10 | 12 | 14 | 16 |
| 344 | 10 | 12 | 14 | 16 |
| 345 | 10 | 12 | 14 | 16 |
| 346 | 10 | 12 | 14 | 16 |
| 347 | 9 | 12 | 14 | 16 |
| 348 | 9 | 11 | 14 | 16 |
| 349 | 9 | 11 | 13 | 16 |
| 350 | 9 | 11 | 13 | 15 |
| 351 | 9 | 11 | 13 | 15 |
| 352 | 9 | 11 | 13 | 15 |
| 353 | 9 | 11 | 13 | 15 |
| 354 | 9 | 11 | 13 | 15 |
| 355 | 9 | 11 | 13 | 15 |
| 356 | 9 | 11 | 13 | 15 |
| 357 | 9 | 11 | 13 | 15 |
| 358 | 9 | 11 | 13 | 14 |
| 359 | 9 | 11 | 12 | 14 |
| 360 | 9 | 10 | 12 | 14 |
| 361 | 8 | 10 | 12 | 14 |
| 362 | 8 | 10 | 12 | 14 |
| 363 | 8 | 10 | 12 | 14 |
| 364 | 8 | 10 | 12 | 14 |
| 365 | 8 | 10 | 12 | 14 |
| 366 | 8 | 10 | 12 | 14 |
| 367 | 8 | 10 | 12 | 13 |
| 368 | 8 | 10 | 12 | 13 |
| 369 | 8 | 10 | 12 | 13 |
| 370 | 8 | 10 | 11 | 13 |
| 371 | 8 | 10 | 11 | 13 |
| 372 | 8 | 10 | 11 | 13 |
| 373 | 8 | 9 | 11 | 13 |
| 374 | 8 | 9 | 11 | 13 |
| 375 | 8 | 9 | 11 | 13 |
| 376 | 8 | 9 | 11 | 13 |
| 377 | 7 | 9 | 11 | 12 |
| 378 | 7 | 9 | 11 | 12 |
| 379 | 7 | 9 | 11 | 12 |
| 380 | 7 | 9 | 11 | 12 |
| 381 | 7 | 9 | 10 | 12 |
| 382 | 7 | 9 | 10 | 12 |
| 383 | 7 | 9 | 10 | 12 |

TABLE 4g

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 511 |
| | Range LPS | | | |
| 384 | 7 | 9 | 10 | 12 |
| 385 | 7 | 9 | 10 | 12 |
| 386 | 7 | 9 | 10 | 12 |
| 387 | 7 | 8 | 10 | 12 |
| 388 | 7 | 8 | 10 | 11 |
| 389 | 7 | 8 | 10 | 11 |
| 390 | 7 | 8 | 10 | 11 |
| 391 | 7 | 8 | 10 | 11 |
| 392 | 7 | 8 | 10 | 11 |
| 393 | 7 | 8 | 10 | 11 |
| 394 | 7 | 8 | 9 | 11 |
| 395 | 6 | 8 | 9 | 11 |
| 396 | 6 | 8 | 9 | 11 |
| 397 | 6 | 8 | 9 | 11 |
| 398 | 6 | 8 | 9 | 11 |
| 399 | 6 | 8 | 9 | 10 |
| 400 | 6 | 8 | 9 | 10 |
| 401 | 6 | 8 | 9 | 10 |
| 402 | 6 | 8 | 9 | 10 |
| 403 | 6 | 7 | 9 | 10 |
| 404 | 6 | 7 | 9 | 10 |
| 405 | 6 | 7 | 9 | 10 |
| 406 | 6 | 7 | 9 | 10 |
| 407 | 6 | 7 | 9 | 10 |
| 408 | 6 | 7 | 8 | 10 |
| 409 | 6 | 7 | 8 | 10 |
| 410 | 6 | 7 | 8 | 10 |
| 411 | 6 | 7 | 8 | 10 |
| 412 | 6 | 7 | 8 | 9 |
| 413 | 6 | 7 | 8 | 9 |
| 414 | 6 | 7 | 8 | 9 |
| 415 | 6 | 7 | 8 | 9 |
| 416 | 6 | 7 | 8 | 9 |
| 417 | 5 | 7 | 8 | 9 |
| 418 | 5 | 7 | 8 | 9 |
| 419 | 5 | 7 | 8 | 9 |
| 420 | 5 | 7 | 8 | 9 |
| 421 | 5 | 6 | 8 | 9 |
| 422 | 5 | 6 | 8 | 9 |
| 423 | 5 | 6 | 8 | 9 |
| 424 | 5 | 6 | 7 | 9 |
| 425 | 5 | 6 | 7 | 9 |
| 426 | 5 | 6 | 7 | 8 |
| 427 | 5 | 6 | 7 | 8 |
| 428 | 5 | 6 | 7 | 8 |
| 429 | 5 | 6 | 7 | 8 |
| 430 | 5 | 6 | 7 | 8 |
| 431 | 5 | 6 | 7 | 8 |
| 432 | 5 | 6 | 7 | 8 |
| 433 | 5 | 6 | 7 | 8 |
| 434 | 5 | 6 | 7 | 8 |
| 435 | 5 | 6 | 7 | 8 |
| 436 | 5 | 6 | 7 | 8 |
| 437 | 5 | 6 | 7 | 8 |
| 438 | 5 | 6 | 7 | 8 |
| 439 | 5 | 6 | 7 | 8 |
| 440 | 5 | 6 | 7 | 8 |
| 441 | 5 | 6 | 7 | 8 |
| 442 | 4 | 5 | 6 | 7 |
| 443 | 4 | 5 | 6 | 7 |
| 444 | 4 | 5 | 6 | 7 |
| 445 | 4 | 5 | 6 | 7 |
| 446 | 4 | 5 | 6 | 7 |
| 447 | 4 | 5 | 6 | 7 |

TABLE 4h

| State | (Range >> 6)&3 Sets | | | |
|---|---|---|---|---|
| | 0 | 1 | 2 | 3 |
| | Range Min | | | |
| | 256 | 320 | 384 | 448 |
| | Range Max | | | |
| | 319 | 383 | 447 | 511 |
| | Range LPS | | | |
| 448 | 4 | 5 | 6 | 7 |
| 449 | 4 | 5 | 6 | 7 |
| 450 | 4 | 5 | 6 | 7 |
| 451 | 4 | 5 | 6 | 7 |
| 452 | 4 | 5 | 6 | 7 |
| 453 | 4 | 5 | 6 | 7 |
| 454 | 4 | 5 | 6 | 7 |
| 455 | 4 | 5 | 6 | 7 |
| 456 | 4 | 5 | 6 | 7 |
| 457 | 4 | 5 | 6 | 7 |
| 458 | 4 | 5 | 6 | 7 |
| 459 | 4 | 5 | 6 | 7 |
| 460 | 4 | 5 | 6 | 7 |
| 461 | 4 | 5 | 6 | 6 |
| 462 | 4 | 5 | 6 | 6 |
| 463 | 4 | 5 | 6 | 6 |
| 464 | 4 | 5 | 5 | 6 |
| 465 | 4 | 5 | 5 | 6 |
| 466 | 4 | 5 | 5 | 6 |
| 467 | 4 | 5 | 5 | 6 |
| 468 | 4 | 4 | 5 | 6 |
| 469 | 4 | 4 | 5 | 6 |
| 470 | 4 | 4 | 5 | 6 |
| 471 | 4 | 4 | 5 | 6 |
| 472 | 4 | 4 | 5 | 6 |
| 473 | 4 | 4 | 5 | 6 |
| 474 | 3 | 4 | 5 | 6 |
| 475 | 3 | 4 | 5 | 6 |
| 476 | 3 | 4 | 5 | 6 |
| 477 | 3 | 4 | 5 | 6 |
| 478 | 3 | 4 | 5 | 6 |
| 479 | 3 | 4 | 5 | 6 |
| 480 | 3 | 4 | 5 | 6 |
| 481 | 3 | 4 | 5 | 6 |
| 482 | 3 | 4 | 5 | 5 |
| 483 | 3 | 4 | 5 | 5 |
| 484 | 3 | 4 | 5 | 5 |
| 485 | 3 | 4 | 5 | 5 |
| 486 | 3 | 4 | 5 | 5 |
| 487 | 3 | 4 | 5 | 5 |
| 488 | 3 | 4 | 5 | 5 |
| 489 | 3 | 4 | 4 | 5 |
| 490 | 3 | 4 | 4 | 5 |
| 491 | 3 | 4 | 4 | 5 |
| 492 | 3 | 4 | 4 | 5 |
| 493 | 3 | 4 | 4 | 5 |
| 494 | 3 | 4 | 4 | 5 |
| 495 | 3 | 4 | 4 | 5 |
| 496 | 3 | 4 | 4 | 5 |
| 497 | 3 | 4 | 4 | 5 |
| 498 | 3 | 4 | 4 | 5 |
| 499 | 3 | 4 | 4 | 5 |
| 500 | 3 | 3 | 4 | 5 |
| 501 | 3 | 3 | 4 | 5 |
| 502 | 3 | 3 | 4 | 5 |
| 503 | 3 | 3 | 4 | 5 |
| 504 | 3 | 3 | 4 | 5 |
| 505 | 3 | 3 | 4 | 5 |
| 506 | 3 | 3 | 4 | 5 |
| 507 | 3 | 3 | 4 | 5 |
| 508 | 3 | 3 | 4 | 4 |
| 509 | 3 | 3 | 4 | 4 |
| 510 | 3 | 3 | 4 | 4 |
| 511 | 3 | 3 | 4 | 4 |

Figures 3, 4:
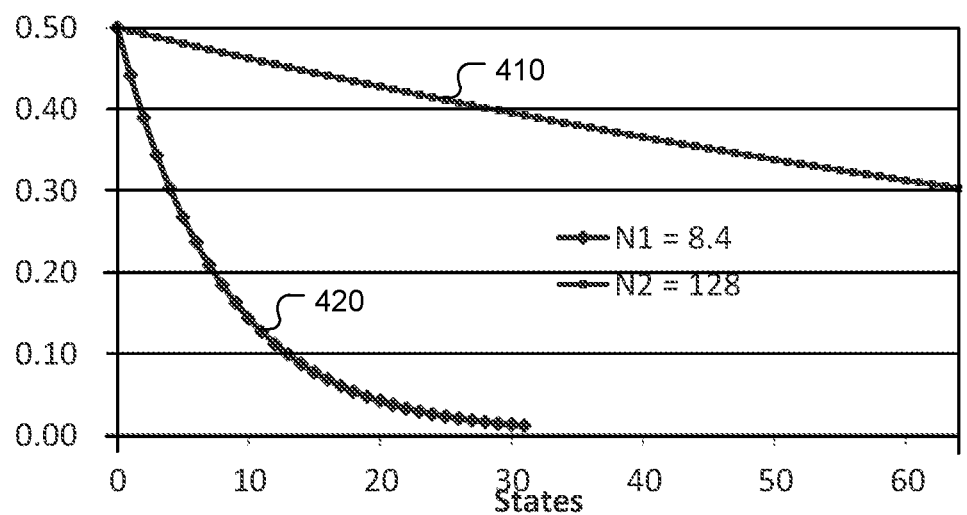
FIG. 3 illustrates an example of Sum-modified Laplacian Measure (SLM) of each pixel, where each square denotes a pixel and pixels of SLMn are filtered by one filter, and n can be 1, 2, or 3 in this example.
FIG. 4 illustrates an example of table-based two-parameter context-based adaptive binary arithmetic coding (CABAC), where one parameter provides faster updater rate and the other parameter provides slower update rate.

FIG. 4 illustrates an example of table-based two-parameter context-based adaptive binary arithmetic coding (CABAC), where one parameter (i.e., $N_1$ corresponding to $\alpha_1$) provides faster updater rate and the other parameter (i.e., $N_2$ corresponding to $\alpha_2$) provides slower update rate.

For each context, it has multiple probability states associated with multiple parameters. For example, it may have two probability states associated with two parameters for each context: one for $\alpha_1$ and another for $\alpha_2$. The states (e.g. state a and state b) in each context are updated independently. For example, for encoding/decoding a bin, one state can be updated to the LPS state and the other can be updated to the MPS state. When deriving the range LPS for coding (RLPSC), the range LPS of each state can be derived by table lookup. If the MPS of two states are the same, the RLPSC is the average of the range LPS of state a (RLPS_a) and the range LPS of state b (RLPS_b). Otherwise, the average range of bin-0 and average range of bin-1 are derived. The RLPSC is the average range with smaller value. For example, if RLPS_a is smaller, the RLPSC is equal to the average RLPS_a and range_MPS_b. If RLPS_b is smaller, the RLPSC is equal to the average RLPS_b and range_MPS_a. range_MPS_x is equal to (range−RLPS_x), where x corresponds to a or b. The average operation between value A and value B can be implemented using the right-shift operation, such as ((A+B)>>1) or ((A+B+1)>>1). The RLPSC, RMPSC (range MPS for coding), and MPS can be derived according to the process in the following table:

TABLE 5

```
if (MPS_a == MPS_b)
{
  MPS = MPS_a;
  RLPSC = (RLPS_a + RLPS_b ) >> 1;
}
else
{
  if(RLPS_a < RLPS_b)
  {
    MPS = MPS_a;
    RLPSC = (RLPS_a + (range − RLPS_b )) >> 1;
  }
  else
  {
    MPS = MPS_b;
    RLPSC = (RLPS_b + (range − RLPS_a )) >> 1;
  }
}
RMPSC = range − RLPSC
```

The derived range LPS for coding and range MPS for coding, which is equal to (range−RLPSC), can be used for HEVC CABAC. The table-based multi-parameter CABAC as shown above can reduce the lookup table (LUT) size substantially.

In the multi-table based CABAC, the MPS values or the LPS values associated with the probability states for a given context may be different. As mentioned above, the two probability states for two-table case may have different MPS or LPS values. Therefore, instead of dealing with the probability model associated with MPS and LPS, it is also possible to deal with bin values 0 and 1. Accordingly, another method is to use the LPS table to derive the RangeOne or the RangeZero for each probability state, where RangeOne is the range value for the bin value being 1 and RangeZero is the range value for the bin value being 0. The averaged RangeOne or RangeZero can be derived by averaging the RangeOnes or the RangeZeros respectively. The RangeOne for coding (ROFC) and RangeZero for coding (RZFC) can be derived by the process as shown in the Tables 6 to 9:

TABLE 6

RangeZero_a = ((MPS_a == 1) ? RLPS_a : (range − RLPS_a ));
RangeZero_b = ((MPS_b == 1) ? RLPS_b : (range − RLPS_b ));
RZFC = (RangeZero_a + RangeZero_b ) >> 1;
ROFC = range − RZFC;
or
ROFC = (2*range − RangeZero_a − RangeZero_b +1)>>1;

TABLE 7

RangeZero_a = ((MPS_a == 1) ? RLPS_a : (range − RLPS_a ));
RangeZero_b = ((MPS_b == 1) ? RLPS_b : (range − RLPS_b ));
RZFC = (RangeZero_a + RangeZero_b + 1 ) >> 1;
ROFC = range − RZFC;
or
ROFC = (2*range − RangeZero_a − RangeZero_b)>>1;

TABLE 8

RangeOne_a = ((MPS_a == 0) ? RLPS_a : (range − RLPS_a ));
RangeOne_b = ((MPS_b == 0) ? RLPS_b : (range − RLPS_b ));
ROFC = (RangeOne_a + RangeOne_b ) >> 1;
RZFC = range − ROFC;
or
RZFC = (2*range − RangeOne_a − RangeOne_b +1)>>1;

TABLE 9

RangeOne_a = ((MPS_a == 0) ? RLPS_a : (range − RLPS_a ));
RangeOne_b = ((MPS_b == 0) ? RLPS_b : (range − RLPS_b ));
ROFC = (RangeOne_a + RangeOne_b +1) >> 1;
RZFC = range − ROFC;
or
RZFC = (2*range − RangeOne_a − RangeOne_b)>>1;

The derived ROFC and RZFC can be used for CABAC. The table-based multi-parameter CABAC as disclosed above can reduce the LUT size substantially.

To further reduce the LUT size, the LUT can be down-sampled. For example, the LUT for $\alpha_1$ can be down-sampled. The down-sampled LUT can be LPS transition table and/or range LPS table. Two kinds of down-sampling method are shown below.

Uniform quantization:

M:1 compression by storing 0, M, 2M, 3M, . . . states, where M=2, 4, 8.

For LPS transition, next_LPS_state(K)=next_LPS_state (K/M)+K % M or next_LPS_state(K)=next_LPS_state (K/M)+K % M except for K=0, or K=0, 1.

Non-uniform quantization:

No compression for states in [0,N/4−1],

2:1 compression for states in [N/4, N/2−1],

4:1 compression for states in [N/2, N−1], and

N can be 512

For example, Table 10 illustrates an example of the range LPS LUT for $\alpha_1$ with the compression ratio M=8. For a state K, its rangeLPS is LUT(K/M).

TABLE 10

| | (Range >> 6)&3 | | | |
|---|---|---|---|---|
| | Sets | | | |
| | 0 | 1 | 2 | 3 |
| | | | Range Min | |
| | 256 | 320 | 384 | 448 |
| | | | Range Max | |
| | 319 | 383 | 447 | 511 |
| State | | | Range LPS | |
| 0 | 144 | 176 | 208 | 240 |
| 8 | 135 | 165 | 195 | 225 |
| 16 | 127 | 155 | 183 | 212 |
| 24 | 119 | 146 | 172 | 199 |
| 32 | 112 | 137 | 162 | 187 |
| 40 | 105 | 129 | 152 | 175 |
| 48 | 99 | 121 | 143 | 165 |
| 56 | 93 | 113 | 134 | 155 |
| 64 | 87 | 107 | 126 | 145 |
| 72 | 82 | 100 | 118 | 136 |
| 80 | 77 | 94 | 111 | 128 |
| 88 | 72 | 88 | 104 | 120 |
| 96 | 68 | 83 | 98 | 113 |
| 104 | 64 | 78 | 92 | 106 |
| 112 | 60 | 73 | 86 | 100 |
| 120 | 56 | 69 | 81 | 94 |
| 128 | 53 | 64 | 76 | 88 |
| 136 | 50 | 61 | 72 | 83 |
| 144 | 47 | 57 | 67 | 78 |
| 152 | 44 | 53 | 63 | 73 |
| 160 | 41 | 50 | 59 | 68 |
| 168 | 39 | 47 | 56 | 64 |
| 176 | 36 | 44 | 52 | 60 |
| 184 | 34 | 42 | 49 | 57 |
| 192 | 32 | 39 | 46 | 53 |
| 200 | 30 | 37 | 43 | 50 |
| 208 | 28 | 34 | 41 | 47 |
| 216 | 26 | 32 | 38 | 44 |
| 224 | 25 | 30 | 36 | 41 |
| 232 | 23 | 29 | 34 | 39 |
| 240 | 22 | 27 | 32 | 37 |
| 248 | 21 | 25 | 30 | 34 |
| 256 | 19 | 24 | 28 | 32 |
| 264 | 18 | 22 | 26 | 30 |
| 272 | 17 | 21 | 25 | 28 |
| 280 | 16 | 20 | 23 | 27 |
| 288 | 15 | 18 | 22 | 25 |
| 296 | 14 | 17 | 20 | 24 |
| 304 | 13 | 16 | 19 | 22 |
| 312 | 12 | 15 | 18 | 21 |
| 320 | 12 | 14 | 17 | 20 |
| 328 | 11 | 13 | 16 | 18 |
| 336 | 10 | 13 | 15 | 17 |
| 344 | 10 | 12 | 14 | 16 |
| 352 | 9 | 11 | 13 | 15 |
| 360 | 9 | 10 | 12 | 14 |
| 368 | 8 | 10 | 12 | 13 |
| 376 | 8 | 9 | 11 | 13 |
| 384 | 7 | 9 | 10 | 12 |
| 392 | 7 | 8 | 10 | 11 |
| 400 | 6 | 8 | 9 | 10 |
| 408 | 6 | 7 | 8 | 10 |
| 416 | 6 | 7 | 8 | 9 |
| 424 | 5 | 6 | 7 | 9 |
| 432 | 5 | 6 | 7 | 8 |
| 440 | 5 | 6 | 7 | 8 |
| 448 | 4 | 5 | 6 | 7 |
| 456 | 4 | 5 | 6 | 7 |
| 464 | 4 | 5 | 5 | 6 |
| 472 | 4 | 4 | 5 | 6 |
| 480 | 3 | 4 | 5 | 6 |
| 488 | 3 | 4 | 5 | 5 |
| 496 | 3 | 4 | 4 | 5 |
| 504 | 3 | 3 | 4 | 5 |

Since $\alpha_1$ and $\alpha_2$ are related by $\alpha_1=(\alpha_2)^{16}$, the table of $\alpha_2$ can be reused for $\alpha_1$. The state S1 in $\alpha_1$ is equal to the state S1*16 in $\alpha_2$. For example, the state 1 in $\alpha_1$ is equal to the state 16 in $\alpha_2$, and the state 2 in $\alpha_1$ is equal to the state 32 in $\alpha_2$.

Table 11 illustrates an example of the next LPS state for $\alpha_1$, where "−1" in the table means changing to MPS and the state is set to 0 and "−2" means changing to MPS and the state is set to 1.

TABLE 11

| State in $\alpha_1$ | next_LPS_State for $\alpha_1$ |
|---|---|
| 0 | −1 or −2 |
| 1 | 0 |
| 2 | 1 |
| 3 | 1 |
| 4 | 2 |
| 5 | 3 |
| 6 | 3 |
| 7 | 4 |
| 8 | 5 |
| 9 | 5 |
| 10 | 6 |
| 11 | 6 |
| 12 | 7 |
| 13 | 7 |
| 14 | 8 |
| 15 | 8 |
| 16 | 8 |
| 17 | 9 |
| 18 | 9 |
| 19 | 9 |
| 20 | 9 |
| 21 | 10 |
| 22 | 10 |
| 23 | 10 |
| 24 | 10 |
| 25 | 10 |
| 26 | 10 |
| 27 | 11 |
| 28 | 11 |
| 29 | 11 |
| 30 | 11 |
| 31 | 11 |

Table 12 illustrates an example of the next LPS state for $\alpha_2$ with the compression ratio M equal to 8. For a state K, its next LPS state is equal to (next_LPS_state (K/M)+K % M). For state 0, its next LPS state can be −1 or −2, where "−1" means changing to MPS and the state is set to 0, and "−2" means changing to MPS and the state is set to 1.

TABLE 12

| State in $\alpha_1$ | next_LPS_State for $\alpha_1$ |
|---|---|
| 0 | −1 or −2 |
| 1 | 0 |
| 2 | 1 |
| 3 | 1 |
| 4 | 2 |
| 5 | 3 |
| 6 | 3 |
| 7 | 4 |
| 8 | 5 |
| 9 | 5 |
| 10 | 6 |
| 11 | 6 |
| 12 | 7 |
| 13 | 7 |
| 14 | 8 |
| 15 | 8 |
| 16 | 8 |
| 17 | 9 |
| 18 | 9 |
| 19 | 9 |
| 20 | 9 |
| 21 | 10 |
| 22 | 10 |
| 23 | 10 |
| 24 | 10 |
| 25 | 10 |
| 26 | 10 |
| 27 | 11 |
| 28 | 11 |
| 29 | 11 |
| 30 | 11 |
| 31 | 11 |

For state initialization, the initial state derivation used by HEVC can be re-used. However, a lookup table to map the initial state (probability) in HEVC to the nearest initial state (probability) is used according to the table-based multi-parameter CABAC of the present invention. Table 13 illustrates an example of the initial state mapping table for $\alpha_1$ and $\alpha_2$.

TABLE 13

| State in HEVC | State for $\alpha_1$ | State for $\alpha_2$ |
|---|---|---|
| 0 | 0 | 0 |
| 1 | 0 | 7 |
| 2 | 1 | 13 |
| 3 | 1 | 20 |
| 4 | 2 | 27 |
| 5 | 2 | 33 |
| 6 | 3 | 40 |
| 7 | 3 | 47 |
| 8 | 3 | 53 |
| 9 | 4 | 60 |
| 10 | 4 | 66 |
| 11 | 5 | 73 |
| 12 | 5 | 80 |
| 13 | 5 | 86 |
| 14 | 6 | 93 |
| 15 | 6 | 100 |
| 16 | 7 | 106 |
| 17 | 7 | 113 |
| 18 | 7 | 120 |
| 19 | 8 | 126 |
| 20 | 8 | 133 |
| 21 | 9 | 140 |
| 22 | 9 | 146 |
| 23 | 10 | 153 |
| 24 | 10 | 159 |
| 25 | 10 | 166 |
| 26 | 11 | 173 |
| 27 | 11 | 179 |
| 28 | 12 | 186 |
| 29 | 12 | 193 |
| 30 | 12 | 199 |
| 31 | 13 | 206 |
| 32 | 13 | 213 |
| 33 | 14 | 219 |
| 34 | 14 | 226 |
| 35 | 15 | 233 |
| 36 | 15 | 239 |
| 37 | 15 | 246 |
| 38 | 16 | 253 |
| 39 | 16 | 259 |
| 40 | 17 | 266 |
| 41 | 17 | 272 |
| 42 | 17 | 279 |
| 43 | 18 | 286 |
| 44 | 18 | 292 |
| 45 | 19 | 299 |
| 46 | 19 | 306 |

TABLE 13-continued

| State in HEVC | State for $\alpha_1$ | State for $\alpha_2$ |
|---|---|---|
| 47 | 20 | 312 |
| 48 | 20 | 319 |
| 49 | 20 | 326 |
| 50 | 21 | 332 |
| 51 | 21 | 339 |
| 52 | 22 | 346 |
| 53 | 22 | 352 |
| 54 | 22 | 359 |
| 55 | 23 | 365 |
| 56 | 23 | 372 |
| 57 | 24 | 379 |
| 58 | 24 | 385 |
| 59 | 25 | 392 |
| 60 | 25 | 399 |
| 61 | 25 | 405 |
| 62 | 26 | 412 |
| 63 | 26 | 419 |

In this invention, we also propose to use more than one parameter (e.g. more than one α) for CABAC coding. For each α, it has its states, rangeLPS table (or rangeOne table, or rangeZero table), next MPS table, and next LPS table. For each context, it can choose to use single α or two α's. If two α's are used, the methods mentioned above can be used. Some syntaxes can use single α, and some syntaxes can use two α's. This side information (e. g. information to indicate syntax using one α or two α's and to identify which α) can be predefined or signalled in the bitstream. For example, the coefficient related the syntaxes can use single α, and others syntaxes can use two α's. In another example, the coefficient-related syntaxes can use two α's, and others syntaxes can use single α. These α can be derived by using eqs. 4, 19, and 20. For example, $\alpha_5$ can be $1-(1/128)$; $\alpha_1$ can be $(\alpha_5)^{16}$; $\alpha_2$ can be $(\alpha_5)^8$; $\alpha_3$ can be $(\alpha_5)^4$; and $\alpha_4$ can be $(\alpha_5)^2$. The rangeLPS tables can be shared. Only the rangeLPS table for smallest α (e.g. $\alpha_5$) needs to be stored. The rangeLPS tables for other α are a subset of the rangeLPS tables of the smallest α. The state number for each α is also predefined. Each context stores information regarding which α is used and the current state.

In CABAC, the valid range value is from 256 to 510. For the rangeLPS derivation, the number of columns required depends on the resolution of range. For example, in Table 3 and Tables 4a-4h, the range is divided into four parts: 256 to 319, 320 to 383, 384 to 447, and 448 to 510. The middle value (mid_value) of each range part can be derived accordingly, such as 288, 352, 416, and 480 respectively. For the first state (first entry) in each column, the probability is (0.5*mid_value). The second state in each column is the first state multiplied by α. The following states in each column are the previous state multiplied by α. For rangeLPS derivation, the mid value can be changed to a value equal to or larger than the smallest range value (e.g. 256, 320, 384, and 448) and equal to or smaller than the largest range value (e.g. 319, 383, 447, and 510).

In JCTVC-F254 and VCEG-AZ07, the rangeOne table covers the probability from 0.0 to 1.0. However, it makes the LUT too large for implemented in terms of hardware cost. The LUT is 144 times of the LUT of HEVC. Moreover, because the entry value of the RangeOne or RangeZero is derived from the MinRange (eq. 18), the coding efficiency will dropped dramatically if the down-sampled LUT is used.

Therefore, a method is disclosed in the present invention to store the probability range from 0.0 to 0.5 only, which is called range smaller half (rangeSH). The values in the other half of the table can be derived by using (range−rangeSH). The number of rows defines the resolution of the probabilities. For example, a rangeSHtable with 64 rows can be designed for probability range from 0.5 to 0.0. Each row represents the rangeLPS for a probability range of 1/64. The value of rangeSH is derived by ((range A)*(Prob B)). Table 14 illustrates an exemplary rangeSH table with 4 columns and 64 rows. The first row represents the rangeSH for probability from 63/128 to 64/128 in four different range sections. In Table 14, the range A corresponds to range Mid and Prob B corresponds to Prob Max. The value of rangeSH is derived by ((range Mid)*(Prob Max)).

TABLE 14

| | | | (Range >> 6)&3 | | | |
|---|---|---|---|---|---|---|
| | | | | | rangeIdx | |
| | | | 0 | 1 | 2 | 3 |
| | | | | | range Min | |
| | | | 256 | 320 | 384 | 448 |
| | | | | | range Max | |
| | | | 319 | 383 | 447 | 511 |
| Prob | Prob | | | | range Mid | |
| Max | Min | probIdx | 288 | 352 | 416 | 480 |
| 64/128 | 63/128 | 63 | 144 | 176 | 208 | 240 |
| 63/128 | 62/128 | 62 | 142 | 173 | 205 | 236 |
| 62/128 | 61/128 | 61 | 140 | 171 | 202 | 233 |
| 61/128 | 60/128 | 60 | 137 | 168 | 198 | 229 |
| 60/128 | 59/128 | 59 | 135 | 165 | 195 | 225 |
| 59/128 | 58/128 | 58 | 133 | 162 | 192 | 221 |
| 58/128 | 57/128 | 57 | 131 | 160 | 189 | 218 |
| 57/128 | 56/128 | 56 | 128 | 157 | 185 | 214 |
| 56/128 | 55/128 | 55 | 126 | 154 | 182 | 210 |
| 55/128 | 54/128 | 54 | 124 | 151 | 179 | 206 |
| 54/128 | 53/128 | 53 | 122 | 149 | 176 | 203 |
| 53/128 | 52/128 | 52 | 119 | 146 | 172 | 199 |
| 52/128 | 51/128 | 51 | 117 | 143 | 169 | 195 |
| 51/128 | 50/128 | 50 | 115 | 140 | 166 | 191 |
| 50/128 | 49/128 | 49 | 113 | 138 | 163 | 188 |
| 49/128 | 48/128 | 48 | 110 | 135 | 159 | 184 |
| 48/128 | 47/128 | 47 | 108 | 132 | 156 | 180 |
| 47/128 | 46/128 | 46 | 106 | 129 | 153 | 176 |
| 46/128 | 45/128 | 45 | 104 | 127 | 150 | 173 |
| 45/128 | 44/128 | 44 | 101 | 124 | 146 | 169 |
| 44/128 | 43/128 | 43 | 99 | 121 | 143 | 165 |
| 43/128 | 42/128 | 42 | 97 | 118 | 140 | 161 |
| 42/128 | 41/128 | 41 | 95 | 116 | 137 | 158 |
| 41/128 | 40/128 | 40 | 92 | 113 | 133 | 154 |
| 40/128 | 39/128 | 39 | 90 | 110 | 130 | 150 |
| 39/128 | 38/128 | 38 | 88 | 107 | 127 | 146 |
| 38/128 | 37/128 | 37 | 86 | 105 | 124 | 143 |
| 37/128 | 36/128 | 36 | 83 | 102 | 120 | 139 |
| 36/128 | 35/128 | 35 | 81 | 99 | 117 | 135 |
| 35/128 | 34/128 | 34 | 79 | 96 | 114 | 131 |
| 34/128 | 33/128 | 33 | 77 | 94 | 111 | 128 |
| 33/128 | 32/128 | 32 | 74 | 91 | 107 | 124 |
| 32/128 | 31/128 | 31 | 72 | 88 | 104 | 120 |
| 31/128 | 30/128 | 30 | 70 | 85 | 101 | 116 |
| 30/128 | 29/128 | 29 | 68 | 83 | 98 | 113 |
| 29/128 | 28/128 | 28 | 65 | 80 | 94 | 109 |
| 28/128 | 27/128 | 27 | 63 | 77 | 91 | 105 |
| 27/128 | 26/128 | 26 | 61 | 74 | 88 | 101 |
| 26/128 | 25/128 | 25 | 59 | 72 | 85 | 98 |
| 25/128 | 24/128 | 24 | 56 | 69 | 81 | 94 |
| 24/128 | 23/128 | 23 | 54 | 66 | 78 | 90 |
| 23/128 | 22/128 | 22 | 52 | 63 | 75 | 86 |
| 22/128 | 21/128 | 21 | 50 | 61 | 72 | 83 |
| 21/128 | 20/128 | 20 | 47 | 58 | 68 | 79 |
| 20/128 | 19/128 | 19 | 45 | 55 | 65 | 75 |
| 19/128 | 18/128 | 18 | 43 | 52 | 62 | 71 |
| 18/128 | 17/128 | 17 | 41 | 50 | 59 | 68 |
| 17/128 | 16/128 | 16 | 38 | 47 | 55 | 64 |
| 16/128 | 15/128 | 15 | 36 | 44 | 52 | 60 |

TABLE 14-continued

| | | | (Range >> 6)&3 | | | |
|---|---|---|---|---|---|---|
| | | | \multicolumn{4}{c}{rangeIdx} |
| | | | 0 | 1 | 2 | 3 |
| | | | \multicolumn{4}{c}{range Min} |
| | | | 256 | 320 | 384 | 448 |
| | | | \multicolumn{4}{c}{range Max} |
| | | | 319 | 383 | 447 | 511 |
| Prob | Prob | | \multicolumn{4}{c}{range Mid} |
| Max | Min | probIdx | 288 | 352 | 416 | 480 |
| 15/128 | 14/128 | 14 | 34 | 41 | 49 | 56 |
| 14/128 | 13/128 | 13 | 32 | 39 | 46 | 53 |
| 13/128 | 12/128 | 12 | 29 | 36 | 42 | 49 |
| 12/128 | 11/128 | 11 | 27 | 33 | 39 | 45 |
| 11/128 | 10/128 | 10 | 25 | 30 | 36 | 41 |
| 10/128 | 09/128 | 9 | 23 | 28 | 33 | 38 |
| 09/128 | 08/128 | 8 | 20 | 25 | 29 | 34 |
| 08/128 | 07/128 | 7 | 18 | 22 | 26 | 30 |
| 07/128 | 06/128 | 6 | 16 | 19 | 23 | 26 |
| 06/128 | 05/128 | 5 | 14 | 17 | 20 | 23 |
| 05/128 | 04/128 | 4 | 11 | 14 | 16 | 19 |
| 04/128 | 03/128 | 3 | 9 | 11 | 13 | 15 |
| 03/128 | 02/128 | 2 | 7 | 8 | 10 | 11 |
| 02/128 | 01/128 | 1 | 5 | 6 | 7 | 8 |
| 01/128 | 00/128 | 0 | 2 | 3 | 3 | 4 |

Table 15 illustrates another exemplary derivation method for rangeSH, which is derived by ((range Mid)*((Prob Max+Prob Min)/2)).

TABLE 15

| | | | (Range >> 6)&3 | | | |
|---|---|---|---|---|---|---|
| | | | \multicolumn{4}{c}{rangeIdx} |
| | | | 0 | 1 | 2 | 3 |
| | | | \multicolumn{4}{c}{range Min} |
| | | | 256 | 320 | 384 | 448 |
| | | | \multicolumn{4}{c}{range Max} |
| | | | 319 | 383 | 447 | 511 |
| Prob | Prob | | \multicolumn{4}{c}{range Mid} |
| Max | Min | probIdx | 288 | 352 | 416 | 480 |
| 64/128 | 63/128 | 63 | 143 | 175 | 206 | 238 |
| 63/128 | 62/128 | 62 | 141 | 172 | 203 | 234 |
| 62/128 | 61/128 | 61 | 138 | 169 | 200 | 231 |
| 61/128 | 60/128 | 60 | 136 | 166 | 197 | 227 |
| 60/128 | 59/128 | 59 | 134 | 164 | 193 | 223 |
| 59/128 | 58/128 | 58 | 132 | 161 | 190 | 219 |
| 58/128 | 57/128 | 57 | 129 | 158 | 187 | 216 |
| 57/128 | 56/128 | 56 | 127 | 155 | 184 | 212 |
| 56/128 | 55/128 | 55 | 125 | 153 | 180 | 208 |
| 55/128 | 54/128 | 54 | 123 | 150 | 177 | 204 |
| 54/128 | 53/128 | 53 | 120 | 147 | 174 | 201 |
| 53/128 | 52/128 | 52 | 118 | 144 | 171 | 197 |
| 52/128 | 51/128 | 51 | 116 | 142 | 167 | 193 |
| 51/128 | 50/128 | 50 | 114 | 139 | 164 | 189 |
| 50/128 | 49/128 | 49 | 111 | 136 | 161 | 186 |
| 49/128 | 48/128 | 48 | 109 | 133 | 158 | 182 |
| 48/128 | 47/128 | 47 | 107 | 131 | 154 | 178 |
| 47/128 | 46/128 | 46 | 105 | 128 | 151 | 174 |
| 46/128 | 45/128 | 45 | 102 | 125 | 148 | 171 |
| 45/128 | 44/128 | 44 | 100 | 122 | 145 | 167 |
| 44/128 | 43/128 | 43 | 98 | 120 | 141 | 163 |
| 43/128 | 42/128 | 42 | 96 | 117 | 138 | 159 |
| 42/128 | 41/128 | 41 | 93 | 114 | 135 | 156 |
| 41/128 | 40/128 | 40 | 91 | 111 | 132 | 152 |
| 40/128 | 39/128 | 39 | 89 | 109 | 128 | 148 |
| 39/128 | 38/128 | 38 | 87 | 106 | 125 | 144 |

TABLE 15-continued

| | | | (Range >> 6)&3 | | | |
|---|---|---|---|---|---|---|
| | | | \multicolumn{4}{c}{rangeIdx} |
| | | | 0 | 1 | 2 | 3 |
| | | | \multicolumn{4}{c}{range Min} |
| | | | 256 | 320 | 384 | 448 |
| | | | \multicolumn{4}{c}{range Max} |
| | | | 319 | 383 | 447 | 511 |
| Prob | Prob | | \multicolumn{4}{c}{range Mid} |
| Max | Min | probIdx | 288 | 352 | 416 | 480 |
| 38/128 | 37/128 | 37 | 84 | 103 | 122 | 141 |
| 37/128 | 36/128 | 36 | 82 | 100 | 119 | 137 |
| 36/128 | 35/128 | 35 | 80 | 98 | 115 | 133 |
| 35/128 | 34/128 | 34 | 78 | 95 | 112 | 129 |
| 34/128 | 33/128 | 33 | 75 | 92 | 109 | 126 |
| 33/128 | 32/128 | 32 | 73 | 89 | 106 | 122 |
| 32/128 | 31/128 | 31 | 71 | 87 | 102 | 118 |
| 31/128 | 30/128 | 30 | 69 | 84 | 99 | 114 |
| 30/128 | 29/128 | 29 | 66 | 81 | 96 | 111 |
| 29/128 | 28/128 | 28 | 64 | 78 | 93 | 107 |
| 28/128 | 27/128 | 27 | 62 | 76 | 89 | 103 |
| 27/128 | 26/128 | 26 | 60 | 73 | 86 | 99 |
| 26/128 | 25/128 | 25 | 57 | 70 | 83 | 96 |
| 25/128 | 24/128 | 24 | 55 | 67 | 80 | 92 |
| 24/128 | 23/128 | 23 | 53 | 65 | 76 | 88 |
| 23/128 | 22/128 | 22 | 51 | 62 | 73 | 84 |
| 22/128 | 21/128 | 21 | 48 | 59 | 70 | 81 |
| 21/128 | 20/128 | 20 | 46 | 56 | 67 | 77 |
| 20/128 | 19/128 | 19 | 44 | 54 | 63 | 73 |
| 19/128 | 18/128 | 18 | 42 | 51 | 60 | 69 |
| 18/128 | 17/128 | 17 | 39 | 48 | 57 | 66 |
| 17/128 | 16/128 | 16 | 37 | 45 | 54 | 62 |
| 16/128 | 15/128 | 15 | 35 | 43 | 50 | 58 |
| 15/128 | 14/128 | 14 | 33 | 40 | 47 | 54 |
| 14/128 | 13/128 | 13 | 30 | 37 | 44 | 51 |
| 13/128 | 12/128 | 12 | 28 | 34 | 41 | 47 |
| 12/128 | 11/128 | 11 | 26 | 32 | 37 | 43 |
| 11/128 | 10/128 | 10 | 24 | 29 | 34 | 39 |
| 10/128 | 09/128 | 9 | 21 | 26 | 31 | 36 |
| 09/128 | 08/128 | 8 | 19 | 23 | 28 | 32 |
| 08/128 | 07/128 | 7 | 17 | 21 | 24 | 28 |
| 07/128 | 06/128 | 6 | 15 | 18 | 21 | 24 |
| 06/128 | 05/128 | 5 | 12 | 15 | 18 | 21 |
| 05/128 | 04/128 | 4 | 10 | 12 | 15 | 17 |
| 04/128 | 03/128 | 3 | 8 | 10 | 11 | 13 |
| 03/128 | 02/128 | 2 | 6 | 7 | 8 | 9 |
| 02/128 | 01/128 | 1 | 3 | 4 | 5 | 6 |
| 01/128 | 00/128 | 0 | 1 | 1 | 2 | 2 |

Table 16 illustrates yet another exemplary value derivation method, where rangeSH is derived by ((range Mid)* ((Prob Max+Prob Min)/2)) and the minimum value is clipped to 3. In JCTVC-F254 and VCEG-AZ07, if the probability of one is larger than 0.5, (e.g. 0.64), it means that the probability of zero is 0.36. The 0.36 (in 18-th row) will be used to find the range for rangeZero. The rangeOne can be derived by (range−rangeZero).

TABLE 16

| | | | (Range >> 6)&3 | | | |
|---|---|---|---|---|---|---|
| | | | | rangeIdx | | |
| | | | 0 | 1 | 2 | 3 |
| | | | | range Min | | |
| | | | 256 | 320 | 384 | 448 |
| | | | | range Max | | |
| | | | 319 | 383 | 447 | 511 |
| Prob Max | Prob Min | probIdx | | range Mid | | |
| | | | 288 | 352 | 416 | 480 |
| 64/128 | 63/128 | 63 | 143 | 175 | 206 | 238 |
| 63/128 | 62/128 | 62 | 141 | 172 | 203 | 234 |
| 62/128 | 61/128 | 61 | 138 | 169 | 200 | 231 |
| 61/128 | 60/128 | 60 | 136 | 166 | 197 | 227 |
| 60/128 | 59/128 | 59 | 134 | 164 | 193 | 223 |
| 59/128 | 58/128 | 58 | 132 | 161 | 190 | 219 |
| 58/128 | 57/128 | 57 | 129 | 158 | 187 | 216 |
| 57/128 | 56/128 | 56 | 127 | 155 | 184 | 212 |
| 56/128 | 55/128 | 55 | 125 | 153 | 180 | 208 |
| 55/128 | 54/128 | 54 | 123 | 150 | 177 | 204 |
| 54/128 | 53/128 | 53 | 120 | 147 | 174 | 201 |
| 53/128 | 52/128 | 52 | 118 | 144 | 171 | 197 |
| 52/128 | 51/128 | 51 | 116 | 142 | 167 | 193 |
| 51/128 | 50/128 | 50 | 114 | 139 | 164 | 189 |
| 50/128 | 49/128 | 49 | 111 | 136 | 161 | 186 |
| 49/128 | 48/128 | 48 | 109 | 133 | 158 | 182 |
| 48/128 | 47/128 | 47 | 107 | 131 | 154 | 178 |
| 47/128 | 46/128 | 46 | 105 | 128 | 151 | 174 |
| 46/128 | 45/128 | 45 | 102 | 125 | 148 | 171 |
| 45/128 | 44/128 | 44 | 100 | 122 | 145 | 167 |
| 44/128 | 43/128 | 43 | 98 | 120 | 141 | 163 |
| 43/128 | 42/128 | 42 | 96 | 117 | 138 | 159 |
| 42/128 | 41/128 | 41 | 93 | 114 | 135 | 156 |
| 41/128 | 40/128 | 40 | 91 | 111 | 132 | 152 |
| 40/128 | 39/128 | 39 | 89 | 109 | 128 | 148 |
| 39/128 | 38/128 | 38 | 87 | 106 | 125 | 144 |
| 38/128 | 37/128 | 37 | 84 | 103 | 122 | 141 |
| 37/128 | 36/128 | 36 | 82 | 100 | 119 | 137 |
| 36/128 | 35/128 | 35 | 80 | 98 | 115 | 133 |
| 35/128 | 34/128 | 34 | 78 | 95 | 112 | 129 |
| 34/128 | 33/128 | 33 | 75 | 92 | 109 | 126 |
| 33/128 | 32/128 | 32 | 73 | 89 | 106 | 122 |
| 32/128 | 31/128 | 31 | 71 | 87 | 102 | 118 |
| 31/128 | 30/128 | 30 | 69 | 84 | 99 | 114 |
| 30/128 | 29/128 | 29 | 66 | 81 | 96 | 111 |
| 29/128 | 28/128 | 28 | 64 | 78 | 93 | 107 |
| 28/128 | 27/128 | 27 | 62 | 76 | 89 | 103 |
| 27/128 | 26/128 | 26 | 60 | 73 | 86 | 99 |
| 26/128 | 25/128 | 25 | 57 | 70 | 83 | 96 |
| 25/128 | 24/128 | 24 | 55 | 67 | 80 | 92 |
| 24/128 | 23/128 | 23 | 53 | 65 | 76 | 88 |
| 23/128 | 22/128 | 22 | 51 | 62 | 73 | 84 |
| 22/128 | 21/128 | 21 | 48 | 59 | 70 | 81 |
| 21/128 | 20/128 | 20 | 46 | 56 | 67 | 77 |
| 20/128 | 19/128 | 19 | 44 | 54 | 63 | 73 |
| 19/128 | 18/128 | 18 | 42 | 51 | 60 | 69 |
| 18/128 | 17/128 | 17 | 39 | 48 | 57 | 66 |
| 17/128 | 16/128 | 16 | 37 | 45 | 54 | 62 |
| 16/128 | 15/128 | 15 | 35 | 43 | 50 | 58 |
| 15/128 | 14/128 | 14 | 33 | 40 | 47 | 54 |
| 14/128 | 13/128 | 13 | 30 | 37 | 44 | 51 |
| 13/128 | 12/128 | 12 | 28 | 34 | 41 | 47 |
| 12/128 | 11/128 | 11 | 26 | 32 | 37 | 43 |
| 11/128 | 10/128 | 10 | 24 | 29 | 34 | 39 |
| 10/128 | 09/128 | 9 | 21 | 26 | 31 | 36 |
| 09/128 | 08/128 | 8 | 19 | 23 | 28 | 32 |
| 08/128 | 07/128 | 7 | 17 | 21 | 24 | 28 |
| 07/128 | 06/128 | 6 | 15 | 18 | 21 | 24 |
| 06/128 | 05/128 | 5 | 12 | 15 | 18 | 21 |
| 05/128 | 04/128 | 4 | 10 | 12 | 15 | 17 |
| 04/128 | 03/128 | 3 | 8 | 10 | 11 | 13 |
| 03/128 | 02/128 | 2 | 6 | 7 | 8 | 9 |
| 02/128 | 01/128 | 1 | 3 | 4 | 5 | 6 |
| 01/128 | 00/128 | 0 | 3 | 3 | 3 | 3 |

In one embodiment for deriving the RangeOne (or RangeZero), the probLPS can be derived using the expression: $probLPS=(P>=2^{k-1})?2^{k}-1-P:P$ for a k-bit probability ($2^{k}>P>0$). The expression "x?y:z" represents a logic operation, where if x is TRUE or not equal to 0, evaluates to the value of y; otherwise, evaluates to the value of z. The probIdx can be derived as (probLPS>>(k−n−1)), where the rangeSH table has $2^n$ rows. The rangeIdx is derived as (range>>(8−m))−(256>>m), ((range−256)>>(8−m)), or ((range>>(8−m))&($2^m$−1)), where the rangeSH table has $2^m$ columns. The rangeSH is determined from rangeSHTable[probIdx][rangeIdx]. If P is equal to or larger than $2^{k-1}$ (or the k-th bit of P being 1), the rangeOne is equal to (range−rangeSH) and rangeZero is equal to rangeSH. Otherwise (i.e., P smaller than $2^{k-1}$), the rangeOne is equal to rangeSH and rangeZero is equal to (range−rangeSH).

In the example of JCTVC-F254 and VCEG-AZ07, k is 15, the probLPS is determined from the expression: probLPS=((P>=16384)? 32767−P:P), probIdx is equal to (probLPS>>8), rangeIdx is equal to (range>>6) & 3. If P is equal to or larger than 16384, the rangeOne is equal to (range−rangeSH) and rangeZero is equal to rangeSH. Otherwise (i.e., P smaller than 16384), the rangeOne is equal to rangeSH and rangeZero is equal to (range−rangeSH).

Note that, since the ($2^k$−1) is all ones in binary representation, so the ($2^k$−1−P) is just to perform the bitwise inverse for k bits of LSB (least significant bit). In hardware implementation, the bitwise exclusive or (XOR) for the k-th bit of P and the 0-th to (k)-th bits of P to derive the probLPS.

In another embodiment, the rangeSH table is duplicated to reduce the computation complexity. Table 17 illustrates an example of the mirrored table of Table 16. The entries are mirrored in the boundary between the probIdx 63 and 64. By using this kind of rangeSH table, the probIdx can be derived by probIdx=(P>>(k−n)) directly, where the rangeSH table has $2^n$ rows. In the example of JCTVC-F254 and VCEG-AZ07, k is 15, the probIdx is equal to (P>>8), rangeIdx is equal to ((range>>6)&3). If P is equal to or larger than 16384 (or the 15-th bit of P equal to 1), the rangeOne is equal to (range−rangeSH) and rangeZero is equal to rangeSH. Otherwise (i.e., P smaller than 16384), the rangeOne is equal to rangeSH and rangeZero is equal to (range−rangeSH).

TABLE 17

| | | | (Range >> 6)&3 | | | |
|---|---|---|---|---|---|---|
| | | | | rangeIdx | | |
| | | | 0 | 1 | 2 | 3 |
| | | | | range Min | | |
| | | | 256 | 320 | 384 | 448 |
| | | | | range Max | | |
| | | | 319 | 383 | 447 | 511 |
| Prob Max | Prob Min | probIdx | | range Mid | | |
| | | | 288 | 352 | 416 | 480 |
| 01/128 | 00/128 | 127 | 3 | 3 | 3 | 3 |
| 02/128 | 01/128 | 126 | 3 | 4 | 5 | 6 |
| 03/128 | 02/128 | 125 | 6 | 7 | 8 | 9 |
| 04/128 | 03/128 | 124 | 8 | 10 | 11 | 13 |
| 05/128 | 04/128 | 123 | 10 | 12 | 15 | 17 |
| 06/128 | 05/128 | 122 | 12 | 15 | 18 | 21 |
| 07/128 | 06/128 | 121 | 15 | 18 | 21 | 24 |
| 08/128 | 07/128 | 120 | 17 | 21 | 24 | 28 |
| 09/128 | 08/128 | 119 | 19 | 23 | 28 | 32 |
| 10/128 | 09/128 | 118 | 21 | 26 | 31 | 36 |
| 11/128 | 10/128 | 117 | 24 | 29 | 34 | 39 |

TABLE 17-continued (Range >> 6)&3

| Prob Max | Prob Min | probIdx | rangeIdx 0 range Min 256 range Max 319 range Mid 288 | rangeIdx 1 range Min 320 range Max 383 range Mid 352 | rangeIdx 2 range Min 384 range Max 447 range Mid 416 | rangeIdx 3 range Min 448 range Max 511 range Mid 480 |
|---|---|---|---|---|---|---|
| 12/128 | 11/128 | 116 | 26 | 32 | 37 | 43 |
| 13/128 | 12/128 | 115 | 28 | 34 | 41 | 47 |
| 14/128 | 13/128 | 114 | 30 | 37 | 44 | 51 |
| 15/128 | 14/128 | 113 | 33 | 40 | 47 | 54 |
| 16/128 | 15/128 | 112 | 35 | 43 | 50 | 58 |
| 17/128 | 16/128 | 111 | 37 | 45 | 54 | 62 |
| 18/128 | 17/128 | 110 | 39 | 48 | 57 | 66 |
| 19/128 | 18/128 | 109 | 42 | 51 | 60 | 69 |
| 20/128 | 19/128 | 108 | 44 | 54 | 63 | 73 |
| 21/128 | 20/128 | 107 | 46 | 56 | 67 | 77 |
| 22/128 | 21/128 | 106 | 48 | 59 | 70 | 81 |
| 23/128 | 22/128 | 105 | 51 | 62 | 73 | 84 |
| 24/128 | 23/128 | 104 | 53 | 65 | 76 | 88 |
| 25/128 | 24/128 | 103 | 55 | 67 | 80 | 92 |
| 26/128 | 25/128 | 102 | 57 | 70 | 83 | 96 |
| 27/128 | 26/128 | 101 | 60 | 73 | 86 | 99 |
| 28/128 | 27/128 | 100 | 62 | 76 | 89 | 103 |
| 29/128 | 28/128 | 99 | 64 | 78 | 93 | 107 |
| 30/128 | 29/128 | 98 | 66 | 81 | 96 | 111 |
| 31/128 | 30/128 | 97 | 69 | 84 | 99 | 114 |
| 32/128 | 31/128 | 96 | 71 | 87 | 102 | 118 |
| 33/128 | 32/128 | 95 | 73 | 89 | 106 | 122 |
| 34/128 | 33/128 | 94 | 75 | 92 | 109 | 126 |
| 35/128 | 34/128 | 93 | 78 | 95 | 112 | 129 |
| 36/128 | 35/128 | 92 | 80 | 98 | 115 | 133 |
| 37/128 | 36/128 | 91 | 82 | 100 | 119 | 137 |
| 38/128 | 37/128 | 90 | 84 | 103 | 122 | 141 |
| 39/128 | 38/128 | 89 | 87 | 106 | 125 | 144 |
| 40/128 | 39/128 | 88 | 89 | 109 | 128 | 148 |
| 41/128 | 40/128 | 87 | 91 | 111 | 132 | 152 |
| 42/128 | 41/128 | 86 | 93 | 114 | 135 | 156 |
| 43/128 | 42/128 | 85 | 96 | 117 | 138 | 159 |
| 44/128 | 43/128 | 84 | 98 | 120 | 141 | 163 |
| 45/128 | 44/128 | 83 | 100 | 122 | 145 | 167 |
| 46/128 | 45/128 | 82 | 102 | 125 | 148 | 171 |
| 47/128 | 46/128 | 81 | 105 | 128 | 151 | 174 |
| 48/128 | 47/128 | 80 | 107 | 131 | 154 | 178 |
| 49/128 | 48/128 | 79 | 109 | 133 | 158 | 182 |
| 50/128 | 49/128 | 78 | 111 | 136 | 161 | 186 |
| 51/128 | 50/128 | 77 | 114 | 139 | 164 | 189 |
| 52/128 | 51/128 | 76 | 116 | 142 | 167 | 193 |
| 53/128 | 52/128 | 75 | 118 | 144 | 171 | 197 |
| 54/128 | 53/128 | 74 | 120 | 147 | 174 | 201 |
| 55/128 | 54/128 | 73 | 123 | 150 | 177 | 204 |
| 56/128 | 55/128 | 72 | 125 | 153 | 180 | 208 |
| 57/128 | 56/128 | 71 | 127 | 155 | 184 | 212 |
| 58/128 | 57/128 | 70 | 129 | 158 | 187 | 216 |
| 59/128 | 58/128 | 69 | 132 | 161 | 190 | 219 |
| 60/128 | 59/128 | 68 | 134 | 164 | 193 | 223 |
| 61/128 | 60/128 | 67 | 136 | 166 | 197 | 227 |
| 62/128 | 61/128 | 66 | 138 | 169 | 200 | 231 |
| 63/128 | 62/128 | 65 | 141 | 172 | 203 | 234 |
| 64/128 | 63/128 | 64 | 143 | 175 | 206 | 238 |
| 64/128 | 63/128 | 63 | 143 | 175 | 206 | 238 |
| 63/128 | 62/128 | 62 | 141 | 172 | 203 | 234 |
| 62/128 | 61/128 | 61 | 138 | 169 | 200 | 231 |
| 61/128 | 60/128 | 60 | 136 | 166 | 197 | 227 |
| 60/128 | 59/128 | 59 | 134 | 164 | 193 | 223 |
| 59/128 | 58/128 | 58 | 132 | 161 | 190 | 219 |
| 58/128 | 57/128 | 57 | 129 | 158 | 187 | 216 |
| 57/128 | 56/128 | 56 | 127 | 155 | 184 | 212 |
| 56/128 | 55/128 | 55 | 125 | 153 | 180 | 208 |
| 55/128 | 54/128 | 54 | 123 | 150 | 177 | 204 |
| 54/128 | 53/128 | 53 | 120 | 147 | 174 | 201 |
| 53/128 | 52/128 | 52 | 118 | 144 | 171 | 197 |
| 52/128 | 51/128 | 51 | 116 | 142 | 167 | 193 |
| 51/128 | 50/128 | 50 | 114 | 139 | 164 | 189 |
| 50/128 | 49/128 | 49 | 111 | 136 | 161 | 186 |
| 49/128 | 48/128 | 48 | 109 | 133 | 158 | 182 |
| 48/128 | 47/128 | 47 | 107 | 131 | 154 | 178 |
| 47/128 | 46/128 | 46 | 105 | 128 | 151 | 174 |
| 46/128 | 45/128 | 45 | 102 | 125 | 148 | 171 |
| 45/128 | 44/128 | 44 | 100 | 122 | 145 | 167 |
| 44/128 | 43/128 | 43 | 98 | 120 | 141 | 163 |
| 43/128 | 42/128 | 42 | 96 | 117 | 138 | 159 |
| 42/128 | 41/128 | 41 | 93 | 114 | 135 | 156 |
| 41/128 | 40/128 | 40 | 91 | 111 | 132 | 152 |
| 40/128 | 39/128 | 39 | 89 | 109 | 128 | 148 |
| 39/128 | 38/128 | 38 | 87 | 106 | 125 | 144 |
| 38/128 | 37/128 | 37 | 84 | 103 | 122 | 141 |
| 37/128 | 36/128 | 36 | 82 | 100 | 119 | 137 |
| 36/128 | 35/128 | 35 | 80 | 98 | 115 | 133 |
| 35/128 | 34/128 | 34 | 78 | 95 | 112 | 129 |
| 34/128 | 33/128 | 33 | 75 | 92 | 109 | 126 |
| 33/128 | 32/128 | 32 | 73 | 89 | 106 | 122 |
| 32/128 | 31/128 | 31 | 71 | 87 | 102 | 118 |
| 31/128 | 30/128 | 30 | 69 | 84 | 99 | 114 |
| 30/128 | 29/128 | 29 | 66 | 81 | 96 | 111 |
| 29/128 | 28/128 | 28 | 64 | 78 | 93 | 107 |
| 28/128 | 27/128 | 27 | 62 | 76 | 89 | 103 |
| 27/128 | 26/128 | 26 | 60 | 73 | 86 | 99 |
| 26/128 | 25/128 | 25 | 57 | 70 | 83 | 96 |
| 25/128 | 24/128 | 24 | 55 | 67 | 80 | 92 |
| 24/128 | 23/128 | 23 | 53 | 65 | 76 | 88 |
| 23/128 | 22/128 | 22 | 51 | 62 | 73 | 84 |
| 22/128 | 21/128 | 21 | 48 | 59 | 70 | 81 |
| 21/128 | 20/128 | 20 | 46 | 56 | 67 | 77 |
| 20/128 | 19/128 | 19 | 44 | 54 | 63 | 73 |
| 19/128 | 18/128 | 18 | 42 | 51 | 60 | 69 |
| 18/128 | 17/128 | 17 | 39 | 48 | 57 | 66 |
| 17/128 | 16/128 | 16 | 37 | 45 | 54 | 62 |
| 16/128 | 15/128 | 15 | 35 | 43 | 50 | 58 |
| 15/128 | 14/128 | 14 | 33 | 40 | 47 | 54 |
| 14/128 | 13/128 | 13 | 30 | 37 | 44 | 51 |
| 13/128 | 12/128 | 12 | 28 | 34 | 41 | 47 |
| 12/128 | 11/128 | 11 | 26 | 32 | 37 | 43 |
| 11/128 | 10/128 | 10 | 24 | 29 | 34 | 39 |
| 10/128 | 09/128 | 9 | 21 | 26 | 31 | 36 |
| 09/128 | 08/128 | 8 | 19 | 23 | 28 | 32 |
| 08/128 | 07/128 | 7 | 17 | 21 | 24 | 28 |
| 07/128 | 06/128 | 6 | 15 | 18 | 21 | 24 |
| 06/128 | 05/128 | 5 | 12 | 15 | 18 | 21 |
| 05/128 | 04/128 | 4 | 10 | 12 | 15 | 17 |
| 04/128 | 03/128 | 3 | 8 | 10 | 11 | 13 |
| 03/128 | 02/128 | 2 | 6 | 7 | 8 | 9 |
| 02/128 | 01/128 | 1 | 3 | 4 | 5 | 6 |
| 01/128 | 00/128 | 0 | 3 | 3 | 3 | 3 |

In another example, the 8-columns mirrored rangeSH table is used as shown in Table 18. For JCTVC-F254 and VCEG-AZ07, the parameter settings correspond to k=15, n=7, and m=3. The related probability parameters are derived as probIdx=(P>>8), rangeIdx=((range>>5) &7). If P is equal to or larger than 16384 (i.e., the 15-th bit of P being 1), the related probability parameters are derived as rangeOne=(range−rangeSH) and rangeZero=rangeSH. Otherwise (i.e., P smaller than 16384), the related probability parameters are derived as rangeOne=rangeSH and rangeZero=(range−rangeSH).

TABLE 18

| | | | (Range >> 5)&7 | | | | | | | |
|---|---|---|---|---|---|---|---|---|---|---|
| | | | rangeIdx | | | | | | | |
| | | | 0 | 1 | 2 | 3 | 4 | 5 | 6 | 7 |
| | | | | | | range Min | | | | |
| | | | 256 | 288 | 320 | 352 | 384 | 416 | 448 | 480 |
| | | | | | | range Max | | | | |
| | | | 287 | 319 | 351 | 383 | 415 | 447 | 479 | 511 |
| Prob Max | Prob Min | probIdx | 272 | 304 | 336 | range Mid 368 | 400 | 432 | 464 | 496 |
| 01/128 | 00/128 | 127 | 3 | 3 | 3 | 3 | 3 | 3 | 3 | 3 |
| 02/128 | 01/128 | 126 | 3 | 4 | 4 | 4 | 5 | 5 | 5 | 6 |
| 03/128 | 02/128 | 125 | 5 | 6 | 7 | 7 | 8 | 8 | 9 | 10 |
| 04/128 | 03/128 | 124 | 7 | 8 | 9 | 10 | 11 | 12 | 13 | 14 |
| 05/128 | 04/128 | 123 | 10 | 11 | 12 | 13 | 14 | 15 | 16 | 17 |
| 06/128 | 05/128 | 122 | 12 | 13 | 14 | 16 | 17 | 19 | 20 | 21 |
| 07/128 | 06/128 | 121 | 14 | 15 | 17 | 19 | 20 | 22 | 24 | 25 |
| 08/128 | 07/128 | 120 | 16 | 18 | 20 | 22 | 23 | 25 | 27 | 29 |
| 09/128 | 08/128 | 119 | 18 | 20 | 22 | 24 | 27 | 29 | 31 | 33 |
| 10/128 | 09/128 | 118 | 20 | 23 | 25 | 27 | 30 | 32 | 34 | 37 |
| 11/128 | 10/128 | 117 | 22 | 25 | 28 | 30 | 33 | 35 | 38 | 41 |
| 12/128 | 11/128 | 116 | 24 | 27 | 30 | 33 | 36 | 39 | 42 | 45 |
| 13/128 | 12/128 | 115 | 27 | 30 | 33 | 36 | 39 | 42 | 45 | 48 |
| 14/128 | 13/128 | 114 | 29 | 32 | 35 | 39 | 42 | 46 | 49 | 52 |
| 15/128 | 14/128 | 113 | 31 | 34 | 38 | 42 | 45 | 49 | 53 | 56 |
| 16/128 | 15/128 | 112 | 33 | 37 | 41 | 45 | 48 | 52 | 56 | 60 |
| 17/128 | 16/128 | 111 | 35 | 39 | 43 | 47 | 52 | 56 | 60 | 64 |
| 18/128 | 17/128 | 110 | 37 | 42 | 46 | 50 | 55 | 59 | 63 | 68 |
| 19/128 | 18/128 | 109 | 39 | 44 | 49 | 53 | 58 | 62 | 67 | 72 |
| 20/128 | 19/128 | 108 | 41 | 46 | 51 | 56 | 61 | 66 | 71 | 76 |
| 21/128 | 20/128 | 107 | 44 | 49 | 54 | 59 | 64 | 69 | 74 | 79 |
| 22/128 | 21/128 | 106 | 46 | 51 | 56 | 62 | 67 | 73 | 78 | 83 |
| 23/128 | 22/128 | 105 | 48 | 53 | 59 | 65 | 70 | 76 | 82 | 87 |
| 24/128 | 23/128 | 104 | 50 | 56 | 62 | 68 | 73 | 79 | 85 | 91 |
| 25/128 | 24/128 | 103 | 52 | 58 | 64 | 70 | 77 | 83 | 89 | 95 |
| 26/128 | 25/128 | 102 | 54 | 61 | 67 | 73 | 80 | 86 | 92 | 99 |
| 27/128 | 26/128 | 101 | 56 | 63 | 70 | 76 | 83 | 89 | 96 | 103 |
| 28/128 | 27/128 | 100 | 58 | 65 | 72 | 79 | 86 | 93 | 100 | 107 |
| 29/128 | 28/128 | 99 | 61 | 68 | 75 | 82 | 89 | 96 | 103 | 110 |
| 30/128 | 29/128 | 98 | 63 | 70 | 77 | 85 | 92 | 100 | 107 | 114 |
| 31/128 | 30/128 | 97 | 65 | 72 | 80 | 88 | 95 | 103 | 111 | 118 |
| 32/128 | 31/128 | 96 | 67 | 75 | 83 | 91 | 98 | 106 | 114 | 122 |
| 33/128 | 32/128 | 95 | 69 | 77 | 85 | 93 | 102 | 110 | 118 | 126 |
| 34/128 | 33/128 | 94 | 71 | 80 | 88 | 96 | 105 | 113 | 121 | 130 |
| 35/128 | 34/128 | 93 | 73 | 82 | 91 | 99 | 108 | 116 | 125 | 134 |
| 36/128 | 35/128 | 92 | 75 | 84 | 93 | 102 | 111 | 120 | 129 | 138 |
| 37/128 | 36/128 | 91 | 78 | 87 | 96 | 105 | 114 | 123 | 132 | 141 |
| 38/128 | 37/128 | 90 | 80 | 89 | 98 | 108 | 117 | 127 | 136 | 145 |
| 39/128 | 38/128 | 89 | 82 | 91 | 101 | 111 | 120 | 130 | 140 | 149 |
| 40/128 | 39/128 | 88 | 84 | 94 | 104 | 114 | 123 | 133 | 143 | 153 |
| 41/128 | 40/128 | 87 | 86 | 96 | 106 | 116 | 127 | 137 | 147 | 157 |
| 42/128 | 41/128 | 86 | 88 | 99 | 109 | 119 | 130 | 140 | 150 | 161 |
| 43/128 | 42/128 | 85 | 90 | 101 | 112 | 122 | 133 | 143 | 154 | 165 |
| 44/128 | 43/128 | 84 | 92 | 103 | 114 | 125 | 136 | 147 | 158 | 169 |
| 45/128 | 44/128 | 83 | 95 | 106 | 117 | 128 | 139 | 150 | 161 | 172 |
| 46/128 | 45/128 | 82 | 97 | 108 | 119 | 131 | 142 | 154 | 165 | 176 |
| 47/128 | 46/128 | 81 | 99 | 110 | 122 | 134 | 145 | 157 | 169 | 180 |
| 48/128 | 47/128 | 80 | 101 | 113 | 125 | 137 | 148 | 160 | 172 | 184 |
| 49/128 | 48/128 | 79 | 103 | 115 | 127 | 139 | 152 | 164 | 176 | 188 |
| 50/128 | 49/128 | 78 | 105 | 118 | 130 | 142 | 155 | 167 | 179 | 192 |
| 51/128 | 50/128 | 77 | 107 | 120 | 133 | 145 | 158 | 170 | 183 | 196 |
| 52/128 | 51/128 | 76 | 109 | 122 | 135 | 148 | 161 | 174 | 187 | 200 |
| 53/128 | 52/128 | 75 | 112 | 125 | 138 | 151 | 164 | 177 | 190 | 203 |
| 54/128 | 53/128 | 74 | 114 | 127 | 140 | 154 | 167 | 181 | 194 | 207 |
| 55/128 | 54/128 | 73 | 116 | 129 | 143 | 157 | 170 | 184 | 198 | 211 |
| 56/128 | 55/128 | 72 | 118 | 132 | 146 | 160 | 173 | 187 | 201 | 215 |
| 57/128 | 56/128 | 71 | 120 | 134 | 148 | 162 | 177 | 191 | 205 | 219 |
| 58/128 | 57/128 | 70 | 122 | 137 | 151 | 165 | 180 | 194 | 208 | 223 |
| 59/128 | 58/128 | 69 | 124 | 139 | 154 | 168 | 183 | 197 | 212 | 227 |
| 60/128 | 59/128 | 68 | 126 | 141 | 156 | 171 | 186 | 201 | 216 | 231 |

TABLE 18-continued

| | | | (Range >> 5)&7 | | | | | | | |
|---|---|---|---|---|---|---|---|---|---|---|
| | | | rangeIdx | | | | | | | |
| | | | 0 | 1 | 2 | 3 | 4 | 5 | 6 | 7 |
| | | | | | | range Min | | | | |
| | | | 256 | 288 | 320 | 352 | 384 | 416 | 448 | 480 |
| | | | | | | range Max | | | | |
| | | | 287 | 319 | 351 | 383 | 415 | 447 | 479 | 511 |
| Prob Max | Prob Min | probIdx | 272 | 304 | 336 | range Mid 368 | 400 | 432 | 464 | 496 |
| 61/128 | 60/128 | 67 | 129 | 144 | 159 | 174 | 189 | 204 | 219 | 234 |
| 62/128 | 61/128 | 66 | 131 | 146 | 161 | 177 | 192 | 208 | 223 | 238 |
| 63/128 | 62/128 | 65 | 133 | 148 | 164 | 180 | 195 | 211 | 227 | 242 |
| 64/128 | 63/128 | 64 | 135 | 151 | 167 | 183 | 198 | 214 | 230 | 246 |
| 64/128 | 63/128 | 63 | 135 | 151 | 167 | 183 | 198 | 214 | 230 | 246 |
| 63/128 | 62/128 | 62 | 133 | 148 | 164 | 180 | 195 | 211 | 227 | 242 |
| 62/128 | 61/128 | 61 | 131 | 146 | 161 | 177 | 192 | 208 | 223 | 238 |
| 61/128 | 60/128 | 60 | 129 | 144 | 159 | 174 | 189 | 204 | 219 | 234 |
| 60/128 | 59/128 | 59 | 126 | 141 | 156 | 171 | 186 | 201 | 216 | 231 |
| 59/128 | 58/128 | 58 | 124 | 139 | 154 | 168 | 183 | 197 | 212 | 227 |
| 58/128 | 57/128 | 57 | 122 | 137 | 151 | 165 | 180 | 194 | 208 | 223 |
| 57/128 | 56/128 | 56 | 120 | 134 | 148 | 162 | 177 | 191 | 205 | 219 |
| 56/128 | 55/128 | 55 | 118 | 132 | 146 | 160 | 173 | 187 | 201 | 215 |
| 55/128 | 54/128 | 54 | 116 | 129 | 143 | 157 | 170 | 184 | 198 | 211 |
| 54/128 | 53/128 | 53 | 114 | 127 | 140 | 154 | 167 | 181 | 194 | 207 |
| 53/128 | 52/128 | 52 | 112 | 125 | 138 | 151 | 164 | 177 | 190 | 203 |
| 52/128 | 51/128 | 51 | 109 | 122 | 135 | 148 | 161 | 174 | 187 | 200 |
| 51/128 | 50/128 | 50 | 107 | 120 | 133 | 145 | 158 | 170 | 183 | 196 |
| 50/128 | 49/128 | 49 | 105 | 118 | 130 | 142 | 155 | 167 | 179 | 192 |
| 49/128 | 48/128 | 48 | 103 | 115 | 127 | 139 | 152 | 164 | 176 | 188 |
| 48/128 | 47/128 | 47 | 101 | 113 | 125 | 137 | 148 | 160 | 172 | 184 |
| 47/128 | 46/128 | 46 | 99 | 110 | 122 | 134 | 145 | 157 | 169 | 180 |
| 46/128 | 45/128 | 45 | 97 | 108 | 119 | 131 | 142 | 154 | 165 | 176 |
| 45/128 | 44/128 | 44 | 95 | 106 | 117 | 128 | 139 | 150 | 161 | 172 |
| 44/128 | 43/128 | 43 | 92 | 103 | 114 | 125 | 136 | 147 | 158 | 169 |
| 43/128 | 42/128 | 42 | 90 | 101 | 112 | 122 | 133 | 143 | 154 | 165 |
| 42/128 | 41/128 | 41 | 88 | 99 | 109 | 119 | 130 | 140 | 150 | 161 |
| 41/128 | 40/128 | 40 | 86 | 96 | 106 | 116 | 127 | 137 | 147 | 157 |
| 40/128 | 39/128 | 39 | 84 | 94 | 104 | 114 | 123 | 133 | 143 | 153 |
| 39/128 | 38/128 | 38 | 82 | 91 | 101 | 111 | 120 | 130 | 140 | 149 |
| 38/128 | 37/128 | 37 | 80 | 89 | 98 | 108 | 117 | 127 | 136 | 145 |
| 37/128 | 36/128 | 36 | 78 | 87 | 96 | 105 | 114 | 123 | 132 | 141 |
| 36/128 | 35/128 | 35 | 75 | 84 | 93 | 102 | 111 | 120 | 129 | 138 |
| 35/128 | 34/128 | 34 | 73 | 82 | 91 | 99 | 108 | 116 | 125 | 134 |
| 34/128 | 33/128 | 33 | 71 | 80 | 88 | 96 | 105 | 113 | 121 | 130 |
| 33/128 | 32/128 | 32 | 69 | 77 | 85 | 93 | 102 | 110 | 118 | 126 |
| 32/128 | 31/128 | 31 | 67 | 75 | 83 | 91 | 98 | 106 | 114 | 122 |
| 31/128 | 30/128 | 30 | 65 | 72 | 80 | 88 | 95 | 103 | 111 | 118 |
| 30/128 | 29/128 | 29 | 63 | 70 | 77 | 85 | 92 | 100 | 107 | 114 |
| 29/128 | 28/128 | 28 | 61 | 68 | 75 | 82 | 89 | 96 | 103 | 110 |
| 28/128 | 27/128 | 27 | 58 | 65 | 72 | 79 | 86 | 93 | 100 | 107 |
| 27/128 | 26/128 | 26 | 56 | 63 | 70 | 76 | 83 | 89 | 96 | 103 |
| 26/128 | 25/128 | 25 | 54 | 61 | 67 | 73 | 80 | 86 | 92 | 99 |
| 25/128 | 24/128 | 24 | 52 | 58 | 64 | 70 | 77 | 83 | 89 | 95 |
| 24/128 | 23/128 | 23 | 50 | 56 | 62 | 68 | 73 | 79 | 85 | 91 |
| 23/128 | 22/128 | 22 | 48 | 53 | 59 | 65 | 70 | 76 | 82 | 87 |
| 22/128 | 21/128 | 21 | 46 | 51 | 56 | 62 | 67 | 73 | 78 | 83 |
| 21/128 | 20/128 | 20 | 44 | 49 | 54 | 59 | 64 | 69 | 74 | 79 |
| 20/128 | 19/128 | 19 | 41 | 46 | 51 | 56 | 61 | 66 | 71 | 76 |
| 19/128 | 18/128 | 18 | 39 | 44 | 49 | 53 | 58 | 62 | 67 | 72 |
| 18/128 | 17/128 | 17 | 37 | 42 | 46 | 50 | 55 | 59 | 63 | 68 |
| 17/128 | 16/128 | 16 | 35 | 39 | 43 | 47 | 52 | 56 | 60 | 64 |
| 16/128 | 15/128 | 15 | 33 | 37 | 41 | 45 | 48 | 52 | 56 | 60 |
| 15/128 | 14/128 | 14 | 31 | 34 | 38 | 42 | 45 | 49 | 53 | 56 |
| 14/128 | 13/128 | 13 | 29 | 32 | 35 | 39 | 42 | 46 | 49 | 52 |
| 13/128 | 12/128 | 12 | 27 | 30 | 33 | 36 | 39 | 42 | 45 | 48 |
| 12/128 | 11/128 | 11 | 24 | 27 | 30 | 33 | 36 | 39 | 42 | 45 |
| 11/128 | 10/128 | 10 | 22 | 25 | 28 | 30 | 33 | 35 | 38 | 41 |
| 10/128 | 09/128 | 9 | 20 | 23 | 25 | 27 | 30 | 32 | 34 | 37 |
| 09/128 | 08/128 | 8 | 18 | 20 | 22 | 24 | 27 | 29 | 31 | 33 |
| 08/128 | 07/128 | 7 | 16 | 18 | 20 | 22 | 23 | 25 | 27 | 29 |
| 07/128 | 06/128 | 6 | 14 | 15 | 17 | 19 | 20 | 22 | 24 | 25 |
| 06/128 | 05/128 | 5 | 12 | 13 | 14 | 16 | 17 | 19 | 20 | 21 |
| 05/128 | 04/128 | 4 | 10 | 11 | 12 | 13 | 14 | 15 | 16 | 17 |
| 04/128 | 03/128 | 3 | 7 | 8 | 9 | 10 | 11 | 12 | 13 | 14 |

TABLE 18-continued

| | | | (Range >> 5)&7 | | | | | | | | |
|---|---|---|---|---|---|---|---|---|---|---|---|
| | | | rangeIdx | | | | | | | | |
| | | | 0 | 1 | 2 | 3 | 4 | 5 | 6 | 7 | |
| | | | | | | | range Min | | | | |
| | | | 256 | 288 | 320 | 352 | 384 | 416 | 448 | 480 | |
| | | | | | | | range Max | | | | |
| | | | 287 | 319 | 351 | 383 | 415 | 447 | 479 | 511 | |
| Prob | Prob | | | | | | range Mid | | | | |
| Max | Min | probIdx | 272 | 304 | 336 | 368 | 400 | 432 | 464 | 496 | |
| 03/128 | 02/128 | 2 | 5 | 6 | 7 | 7 | 8 | 8 | 9 | 10 | |
| 02/128 | 01/128 | 1 | 3 | 4 | 4 | 4 | 5 | 5 | 5 | 6 | |
| 01/128 | 00/128 | 0 | 3 | 3 | 3 | 3 | 3 | 3 | 3 | 3 | |

In another example, the 8 columns by 64 rows mirrored rangeSH table is used as shown in Table 19. For JCTVC-F254 and VCEG-AZ07, the parameter settings correspond to k=15, n=6, and m=3. The related probability parameters are derived as probIdx=(P>>9), rangeIdx=((range>>5) &7). If P is equal to or larger than 16384 (i. e., the 15-th bit of P being 1), the related probability parameters are derived as rangeOne=(range−rangeSH) and rangeZero=rangeSH. Otherwise (i.e., P smaller than 16384), rangeOne=rangeSH and rangeZero=(range−rangeSH). The table size of Table 19 is the same as the rangeSH table of HEVC or H.264/AVC.

TABLE 19

| | | | (Range >> 5)&7 | | | | | | | | |
|---|---|---|---|---|---|---|---|---|---|---|---|
| | | | rangeIdx | | | | | | | | |
| | | | 0 | 1 | 2 | 3 | 4 | 5 | 6 | 7 | |
| | | | | | | | range Min | | | | |
| | | | 256 | 288 | 320 | 352 | 384 | 416 | 448 | 480 | |
| | | | | | | | range Max | | | | |
| | | | 287 | 319 | 351 | 383 | 415 | 447 | 479 | 511 | |
| Prob | Prob | | | | | | range Mid | | | | |
| Max | Min | probIdx | 272 | 304 | 336 | 368 | 400 | 432 | 464 | 496 | |
| 01/64 | 01/64 | 63 | 3 | 3 | 3 | 3 | 3 | 3 | 4 | 4 | |
| 02/64 | 02/64 | 62 | 6 | 7 | 8 | 9 | 9 | 10 | 11 | 12 | |
| 03/64 | 03/64 | 61 | 11 | 12 | 13 | 14 | 16 | 17 | 18 | 19 | |
| 04/64 | 04/64 | 60 | 15 | 17 | 18 | 20 | 22 | 24 | 25 | 27 | |
| 05/64 | 05/64 | 59 | 19 | 21 | 24 | 26 | 28 | 30 | 33 | 35 | |
| 06/64 | 06/64 | 58 | 23 | 26 | 29 | 32 | 34 | 37 | 40 | 43 | |
| 07/64 | 07/64 | 57 | 28 | 31 | 34 | 37 | 41 | 44 | 47 | 50 | |
| 08/64 | 08/64 | 56 | 32 | 36 | 39 | 43 | 47 | 51 | 54 | 58 | |
| 09/64 | 09/64 | 55 | 36 | 40 | 45 | 49 | 53 | 57 | 62 | 66 | |
| 10/64 | 10/64 | 54 | 40 | 45 | 50 | 55 | 59 | 64 | 69 | 74 | |
| 11/64 | 11/64 | 53 | 45 | 50 | 55 | 60 | 66 | 71 | 76 | 81 | |
| 12/64 | 12/64 | 52 | 49 | 55 | 60 | 66 | 72 | 78 | 83 | 89 | |
| 13/64 | 13/64 | 51 | 53 | 59 | 66 | 72 | 78 | 84 | 91 | 97 | |
| 14/64 | 14/64 | 50 | 57 | 64 | 71 | 78 | 84 | 91 | 98 | 105 | |
| 15/64 | 15/64 | 49 | 62 | 69 | 76 | 83 | 91 | 98 | 105 | 112 | |
| 16/64 | 16/64 | 48 | 66 | 74 | 81 | 89 | 97 | 105 | 112 | 120 | |
| 17/64 | 17/64 | 47 | 70 | 78 | 87 | 95 | 103 | 111 | 120 | 128 | |
| 18/64 | 18/64 | 46 | 74 | 83 | 92 | 101 | 109 | 118 | 127 | 136 | |
| 19/64 | 19/64 | 45 | 79 | 88 | 97 | 106 | 116 | 125 | 134 | 143 | |
| 20/64 | 20/64 | 44 | 83 | 93 | 102 | 112 | 122 | 132 | 141 | 151 | |
| 21/64 | 21/64 | 43 | 87 | 97 | 108 | 118 | 128 | 138 | 149 | 159 | |
| 22/64 | 22/64 | 42 | 91 | 102 | 113 | 124 | 134 | 145 | 156 | 167 | |
| 23/64 | 23/64 | 41 | 96 | 107 | 118 | 129 | 141 | 152 | 163 | 174 | |
| 24/64 | 24/64 | 40 | 100 | 112 | 123 | 135 | 147 | 159 | 170 | 182 | |
| 25/64 | 25/64 | 39 | 104 | 116 | 129 | 141 | 153 | 165 | 178 | 190 | |
| 26/64 | 26/64 | 38 | 108 | 121 | 134 | 147 | 159 | 172 | 185 | 198 | |
| 27/64 | 27/64 | 37 | 113 | 126 | 139 | 152 | 166 | 179 | 192 | 205 | |
| 28/64 | 28/64 | 36 | 117 | 131 | 144 | 158 | 172 | 186 | 199 | 213 | |

TABLE 19-continued

| | | | (Range >> 5)&7 | | | | | | | | |
|---|---|---|---|---|---|---|---|---|---|---|---|
| | | | rangeIdx | | | | | | | | |
| | | | 0 | 1 | 2 | 3 | 4 | 5 | 6 | 7 | |
| | | | | | | | range Min | | | | |
| | | | 256 | 288 | 320 | 352 | 384 | 416 | 448 | 480 | |
| | | | | | | | range Max | | | | |
| | | | 287 | 319 | 351 | 383 | 415 | 447 | 479 | 511 | |
| Prob | Prob | | | | | | range Mid | | | | |
| Max | Min | probIdx | 272 | 304 | 336 | 368 | 400 | 432 | 464 | 496 | |
| 29/64 | 29/64 | 35 | 121 | 135 | 150 | 164 | 178 | 192 | 207 | 221 | |
| 30/64 | 30/64 | 34 | 125 | 140 | 155 | 170 | 184 | 199 | 214 | 229 | |
| 31/64 | 31/64 | 33 | 130 | 145 | 160 | 175 | 191 | 206 | 221 | 236 | |
| 32/64 | 32/64 | 32 | 134 | 150 | 165 | 181 | 197 | 213 | 228 | 244 | |
| 32/64 | 32/64 | 31 | 134 | 150 | 165 | 181 | 197 | 213 | 228 | 244 | |
| 31/64 | 31/64 | 30 | 130 | 145 | 160 | 175 | 191 | 206 | 221 | 236 | |
| 30/64 | 30/64 | 29 | 125 | 140 | 155 | 170 | 184 | 199 | 214 | 229 | |
| 29/64 | 29/64 | 28 | 121 | 135 | 150 | 164 | 178 | 192 | 207 | 221 | |
| 28/64 | 28/64 | 27 | 117 | 131 | 144 | 158 | 172 | 186 | 199 | 213 | |
| 27/64 | 27/64 | 26 | 113 | 126 | 139 | 152 | 166 | 179 | 192 | 205 | |
| 26/64 | 26/64 | 25 | 108 | 121 | 134 | 147 | 159 | 172 | 185 | 198 | |
| 25/64 | 25/64 | 24 | 104 | 116 | 129 | 141 | 153 | 165 | 178 | 190 | |
| 24/64 | 24/64 | 23 | 100 | 112 | 123 | 135 | 147 | 159 | 170 | 182 | |
| 23/64 | 23/64 | 22 | 96 | 107 | 118 | 129 | 141 | 152 | 163 | 174 | |
| 22/64 | 22/64 | 21 | 91 | 102 | 113 | 124 | 134 | 145 | 156 | 167 | |
| 21/64 | 21/64 | 20 | 87 | 97 | 108 | 118 | 128 | 138 | 149 | 159 | |
| 20/64 | 20/64 | 19 | 83 | 93 | 102 | 112 | 122 | 132 | 141 | 151 | |
| 19/64 | 19/64 | 18 | 79 | 88 | 97 | 106 | 116 | 125 | 134 | 143 | |
| 18/64 | 18/64 | 17 | 74 | 83 | 92 | 101 | 109 | 118 | 127 | 136 | |
| 17/64 | 17/64 | 16 | 70 | 78 | 87 | 95 | 103 | 111 | 120 | 128 | |
| 16/64 | 16/64 | 15 | 66 | 74 | 81 | 89 | 97 | 105 | 112 | 120 | |
| 15/64 | 15/64 | 14 | 62 | 69 | 76 | 83 | 91 | 98 | 105 | 112 | |
| 14/64 | 14/64 | 13 | 57 | 64 | 71 | 78 | 84 | 91 | 98 | 105 | |
| 13/64 | 13/64 | 12 | 53 | 59 | 66 | 72 | 78 | 84 | 91 | 97 | |
| 12/64 | 12/64 | 11 | 49 | 55 | 60 | 66 | 72 | 78 | 83 | 89 | |
| 11/64 | 11/64 | 10 | 45 | 50 | 55 | 60 | 66 | 71 | 76 | 81 | |
| 10/64 | 10/64 | 9 | 40 | 45 | 50 | 55 | 59 | 64 | 69 | 74 | |
| 09/64 | 09/64 | 8 | 36 | 40 | 45 | 49 | 53 | 57 | 62 | 66 | |
| 08/64 | 08/64 | 7 | 32 | 36 | 39 | 43 | 47 | 51 | 54 | 58 | |
| 07/64 | 07/64 | 6 | 28 | 31 | 34 | 37 | 41 | 44 | 47 | 50 | |
| 06/64 | 06/64 | 5 | 23 | 26 | 29 | 32 | 34 | 37 | 40 | 43 | |
| 05/64 | 05/64 | 4 | 19 | 21 | 24 | 26 | 28 | 30 | 33 | 35 | |
| 04/64 | 04/64 | 3 | 15 | 17 | 18 | 20 | 22 | 24 | 25 | 27 | |
| 03/64 | 03/64 | 2 | 11 | 12 | 13 | 14 | 16 | 17 | 18 | 19 | |
| 02/64 | 02/64 | 1 | 6 | 7 | 8 | 9 | 9 | 10 | 11 | 12 | |
| 01/64 | 01/64 | 0 | 3 | 3 | 3 | 3 | 3 | 3 | 4 | 4 | |

In Tables 17 through 19, the entry value of rangeSH will not necessary be clipped to be larger than 3.

Table 20 illustrates comparison of range lookup table size of an embodiment of the present invention and the JCTVC-F254 with the HEVC standard. The approach based on JCTVC-F254 requires 12126% of the HEVC register size while the embodiment of the present invention requires 870% of the HEVC register size. In other words, the method disclosed in JCTVC-F254 requires a lookup table nearly 14 times as large as the embodiment of the present invention.

TABLE 20

| | Lookup Table | | | |
|---|---|---|---|---|
| | LPS trans. table | range table | Mem. size | Size comparison |
| HEVC | 64 * 6 | 8 * 4 * 64 | 2432 | 100% |
| Table-two-α | 512 * 9 + 32 * 5 | 8 * 4 * 512 | 21152 | 870% |
| JCTVC-F254 | | 9 * 64 * 512 | 294912 | 12126% |

In another embodiment, if the probability of one is larger than 0.5 (e.g 0.64), the probability larger than 0.5 will be used for table lookup. For example, if the range is 500, the fourth column is used. The probability value of 0.14 corresponds to the value in the 47th row, which is 68. rangeOne can be ((range Mid/2)+68)=308, or can be ((range/2)+68)= 318. If rangeOne is larger than the range, rangeOne can be clipped to (range−K), where the K is an integer and K can be different for different range values or different sections.

In the priority-based block filter merge scheme, the first step is to choose maximum N candidates from M pre-defined neighbouring blocks. However, the number of available filter candidates among M pre-defined neighbouring blocks may be smaller than N due to unavailability at picture boundaries, repetitive filters, or filter off. When this case occurs, some coding performance loss may occur. In order to overcome this issue, the following embodiments are disclosed, where one or more filters are added to the candidate list of the priority-based block filter merge scheme. In the first embodiment, additional filters are generated by using available filters. For example, some coefficients far from the center position can be removed to form a new filter. In another example, a new symmetric filter can be generated by averaging the coefficients of one available filter. In yet another example, one or more predefined filters or an average filters from available filters can be added to fill the candidate list of the priority-based block filter merge scheme.

In the embodiments disclosed above, the similarity among to-be-filtered pixel and neighbouring pixels can be used for pixel classification. The neighbouring pixels are defined by using one window, such as a cross pattern, 3×3 square, or 5×5 diamond. The center position of one window is the to-be-filtered pixels. For each neighbouring pixel in this window, if the difference of pixel value between neighbouring pixel and to-be-filtered pixel is smaller than a threshold, the similarity is increased by one. Otherwise, the similarity is not increased. After comparing all neighbouring pixels to to-be-filtered pixel, we can get one similarity value for one to-be-filtered pixel. Based on the similarity values, pixels can be classified into different groups, and different filters are applied for different groups in the ALF (adaptive loop filter) process. During the development of the HEVC standard, the original pixel classification was applied to all pixels in one picture according to HM-7 or before HM-7.0. However, other adaptive schemes, such as CTB-based (coding-tree-block based) ALF scheme was also disclosed during the development of the HEVC standard, where ALF parameters are coded and can be changed from CTB to CTB. It is also possible to apply pixel classification to only some CTBs in one picture.

Figure 5:
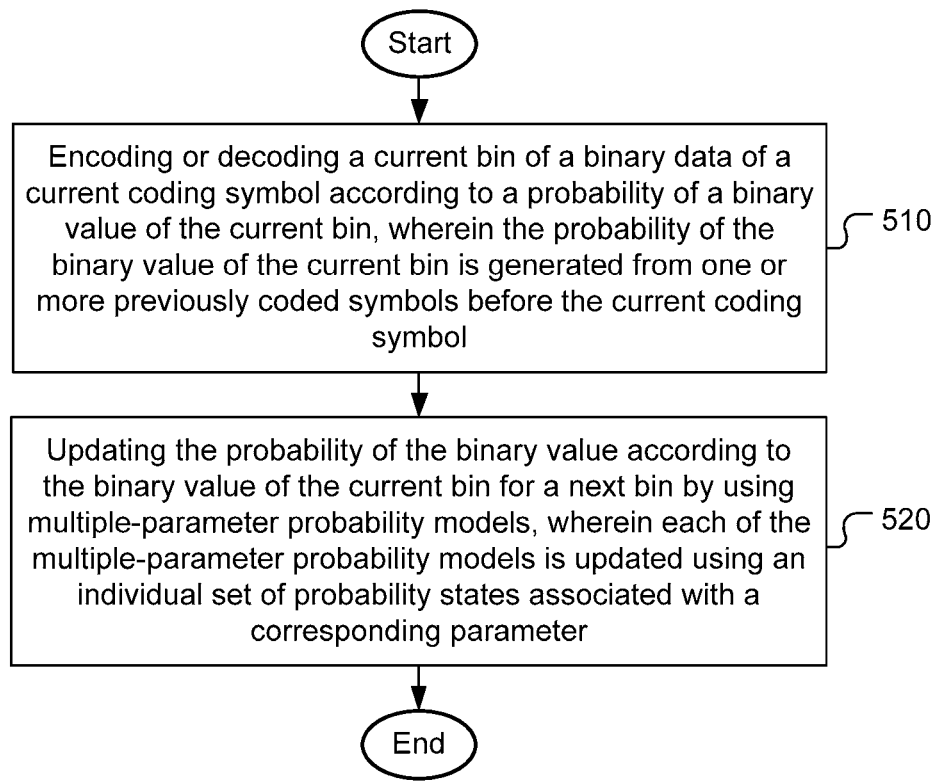
FIG. 5 illustrates an exemplary flowchart for a multiple table based context-based adaptive binary arithmetic coding (CABAC) according to one embodiment of the present invention.

FIG. 5 illustrates an exemplary flowchart for a multiple table based context-based adaptive binary arithmetic coding (CABAC) according to one embodiment of the present invention. The method encode or decode a current bin of a binary data of a current coding symbol according to a probability of a binary value of the current bin as shown in step 510, where the probability of the binary value of current bin is generated from one or more previously coded symbols before the current coding symbol. The probability of the binary value is updated according to the binary value of the current bin for a next bin by using multiple-parameter probability models in step 520, where each of the multiple-parameter probability models is updated using an individual set of probability states associated with a corresponding parameter.

Figure 6:
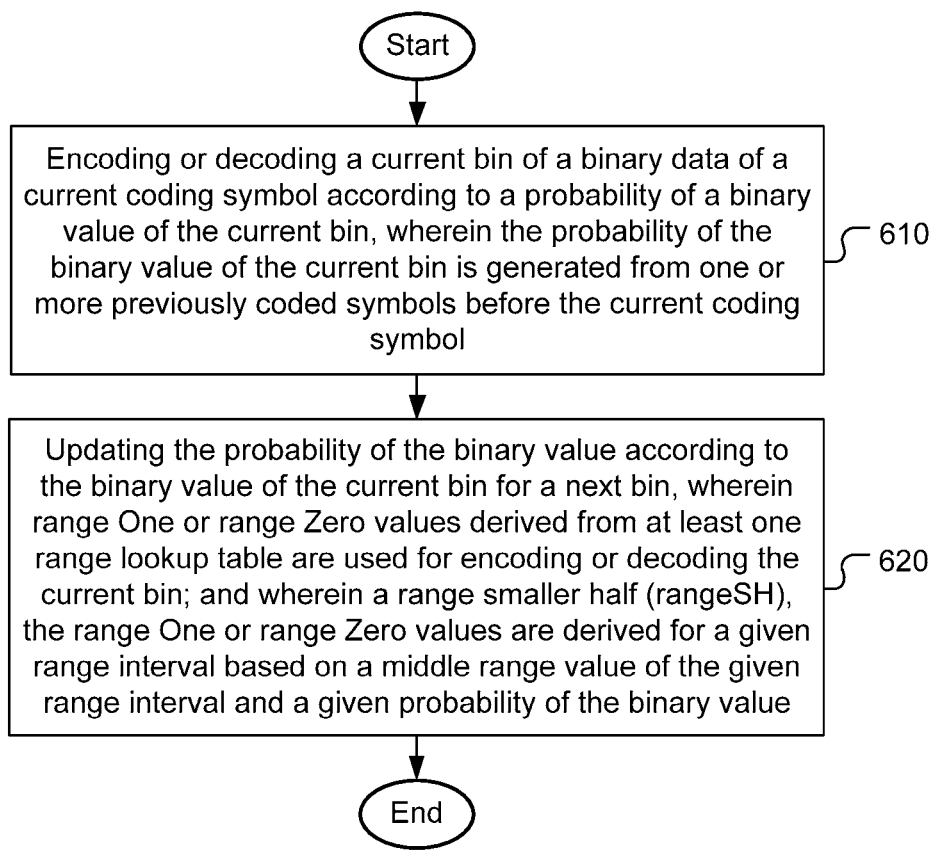
FIG. 6 illustrates an exemplary flowchart for another multiple table based context-based adaptive binary arithmetic coding (CABAC) according to one embodiment of the present invention.

FIG. 6 illustrates an exemplary flowchart for another multiple table based context-based adaptive binary arithmetic coding (CABAC) according to one embodiment of the present invention. The method encode or decode a current bin of a binary data of a current coding symbol according to a probability of a binary value of the current bin as shown in step 610, where the probability of the binary value of the current bin is generated from one or more previously coded symbols before the current coding symbol. The probability of the binary value is updated according to the binary value of the current bin for a next bin in step 620, where range One or range Zero values derived from at least one range lookup table is used for encoding or decoding the current bin, and wherein a range smaller half (rangeSH), the range One or range Zero values are derived for a given range interval based on a middle range value of the given range interval and a given probability of the binary value.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of entropy coding of image or video data in an image or video encoder or decoder, the method comprising:
   encoding or decoding a current bin of a binary data of a current coding symbol according to a CABAC process associated with a probability of a binary value of the current bin; and
   updating the probability of the binary value according to the binary value of the current bin, wherein range One or range Zero values derived from at least one range lookup table are used for encoding or decoding the current bin; and
   wherein a range smaller half (rangeSH), the range One or range Zero values are derived for a given range interval based on the given range interval and a given probability of the binary value.

2. The method of claim 1, wherein said at least one range lookup table comprises arrange Zero table or a range One table.

3. The method of claim 2, wherein one range value is derived for a middle range value of the given range interval and a middle probability value of the given range interval of a Zero probability range or One probability range.

4. The method of claim 3, wherein one range value is derived for a middle range value of the given range interval and a maximum probability value of the given range interval of a Zero probability range or One probability range.

5. The method of claim 2, wherein said at least one range lookup table only includes range values for a Zero probability range or One probability range between 0.0 and 0.5.

6. The method of claim 5, wherein the range value of the Zero probability range or One probability range between 0.5 and 1.0 are derived by (current range–the range values for One probability range or Zero probability range between 0.0 and 0.5).

7. The method of claim 2, wherein said at least one range lookup table includes range values for Zero probability range or One probability range between 0.0 and 1.0, and wherein the range values for the Zero probability range or the One probability range between 0.5 and 1.0 are mirrored from the range values for the Zero probability range or the One probability range between 0.0 and 0.5.

8. An entropy coding apparatus for an image or video encoder or decoder, the entropy coding apparatus comprising one or more electronic circuits configured for:
   encoding or decoding a current bin of a binary data of a current coding symbol according to a CABAC process associated with a probability of a binary value of the current bin; and
   updating the probability of the binary value according to the binary value of the current bin, wherein range One or range Zero values derived from at least one range lookup table are used for encoding or decoding the current bin; and
   wherein a range smaller half (rangeSH), the range One or range Zero values are derived for a given range interval based on the given range interval and a given probability of the binary value.

* * * * *

UNITED STATES PATENT AND TRADEMARK OFFICE
CERTIFICATE OF CORRECTION

PATENT NO. : 10,742,984 B2
APPLICATION NO. : 16/243432
DATED : August 11, 2020
INVENTOR(S) : Chuang et al.

Page 1 of 1

It is certified that error appears in the above-identified patent and that said Letters Patent is hereby corrected as shown below:

In the Claims

In Column 37, Line 20 (in Claim 1), immediately following the word "derived", delete "for", and insert therefor --from--.

In Column 37, Line 27 (in Claim 3), immediately following the word "derived", delete "for", and insert therefor --from--.

In Column 37, Line 31 (in Claim 4), immediately following the word "derived", delete "for", and insert therefor --from--.

In Column 38, Line 29 (in Claim 8), immediately following the word "derived", delete "for", and insert therefor --from--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*